United States Patent
Schurmann

(10) Patent No.: US 6,782,341 B2
(45) Date of Patent: Aug. 24, 2004

(54) DETERMINATION OF SATISFACTION AND DESIRE IN VIRTUAL CREATURES

(76) Inventor: Alfred Schurmann, Postfach 1332, D-76443, Durmersheim (DE)

( * ) Notice: Subject to any disclaimer, the term of this patent is extended or adjusted under 35 U.S.C. 154(b) by 11 days.

(21) Appl. No.: 10/149,247

(22) PCT Filed: Apr. 10, 2001

(86) PCT No.: PCT/DE01/01416

§ 371 (c)(1),
(2), (4) Date: Jun. 7, 2002

(87) PCT Pub. No.: WO02/084589

PCT Pub. Date: Oct. 24, 2002

(65) Prior Publication Data

US 2002/0183968 A1 Dec. 5, 2002

(51) Int. Cl.$^7$ .................. G06F 101/14; G06F 17/18
(52) U.S. Cl. ........................................... 702/179
(58) Field of Search ..................... 702/179, 182; 434/236, 238; 706/11, 15, 44

(56) References Cited

U.S. PATENT DOCUMENTS

| 6,038,493 A | 3/2000 | Tow |
| 6,175,772 B1 | 1/2001 | Kamiya et al. |
| 2003/0059750 A1 * | 3/2003 | Bindler et al. .............. 434/236 |

FOREIGN PATENT DOCUMENTS

| WO | WO 98/06043 | 2/1998 |
| WO | WO 02/23474 | 3/2002 |

OTHER PUBLICATIONS

English Translation of WO 02/23474, Schurmann, Mar. 21, 2002.*
Schurmann A., Simple Thinking Artificial Servant, 1998.*
Schurmann A., Cooperation in a Motivated, Behaviour Based Multi–Agent System, 1998.*
Costa et al; Agents with Emotions in Behavioral Animation; Comn. and Graphics, Perg. Press, Oxford GB, vol. 20, No. 3, May 1, 1996, p. 377–384 the Whole Document.
Oliveira et al; Multi–Agent Systems: Which Research for Which Applications; Robotics and Autonoumous Systems, Elsevier Science Publishers, Amsterdam, NL, vol. 27, No. 1–2, Apr. 30, 1999, pp. 91–106; p. 91, left col., P. I—p. 98, left col., E. 4.
Intern. Search Office of the European Patent Office: Search Report on my Patent application PCT/DE01/01416; Dec. 18, 2001; Rijrwijl, NL; Relevant Pages and lines: Form sheet PCT/ISA220:p.i.l.1–item 1, Form Sheet PCT/ISA210:sheet 1:p. 1, e.1—p. 1, item 5, sheet 2: p. 1 and p. 2.

* cited by examiner

*Primary Examiner*—Michael Nghiem

(57) ABSTRACT

There are described methods for determining intensities of satisfactions and desires of a virtual creature vP (e.g. motivated agent system, virtual man in Internet). These intensities are represented, at time t, by functions bef(vP,b,t) (the intensity of satisfaction with respect to need b) and des(vP, b,t) (the intensity of desire with respect to need b). In this paper are described methods for determining intensities bef(vP,b,t) and des(vP,b,t). These methods may be applied in order to: (i) simulate satisfactions and desires, and determine emotion states of an artificial creature vP, (ii) develop a control algorithm which determines the behavior of vP, (iii) build in such semantic of man emotions into artificial creature vP that vP would better understand emotional behavior of a man.

11 Claims, No Drawings

DETERMINATION OF SATISFACTION AND DESIRE IN VIRTUAL CREATURES

1. Introduction

In this paper are described methods for determining intensities of satisfactions and desires (tensions of needs) of virtual creature vP (e g. a motivated agent system, a virtual human in Internet) The state (the intensity) of satisfaction and desire of virtual creature vP, with respect to need b (at time t), is represented by functions bef(vP,b,t) und des(vP,b,t). These functions were introduced (not formal) and used in Schurmann [AS4] (1998), [AS3] (1998), [AS1] (2000). The description of the patent application [AS1] (2000) is based on function values bef(vP,b,t) and des(vP,b,t). Until now, there is no method for determining intensities of satisfaction bef(vP,b,t) and desire des(vP,b,t) for an artificial creature vP. The methods for determining intensities bef(vP,b,t) and des(vP,b, t) described in this paper can be applied in order.

i. to simulate satisfactions and desires of an artificial creature vP (e g a motivated agent system, a virtual human or mammal in Internet or entertainment software) On the basis of patent description [AS1] (2000), emotion states of vP may with that be formal represented;

ii. to develop motivation function and control algorithm (e.g. as described in Schurnann [AS4] (1998), Sect. 2.7), for artificial creature vP, which determine the behaviour of vP;

iii. to build in such semantic of emotions into creature vP that vP would better understand human emotions.

The methods presented here use notions, functions and methods described in Schurmann [AS1] (2000). These notions and functions are presented in short in Sect. 2 of this paper. In Sect. 3 is given a method for determining intensities of satisfaction, bef(vP,b,t), and desire, des(vP,b,t), by stimulus patterns in situation models and activity descriptions, for needs which are individually associated with situations or activities: GE (to be healthy), AN (for recognition, acknowledgment and self-esteem), LE (to be alive), KS (to have no pain), SE (for sexual relations), NU (to be in normal environment), BW (for bodily activities), SN (for tasty food), SH (for visual beauty). The greatest part of this paper (Sect. 4) contains descriptions of methods for determining intensities bef(vP,b,t) and des(vP,b,t) for standard situations of vP, for the following needs: AU (for attention and identification), NE (curiosity and the need for knowledge), GR (to belong to communities), MA (to have power over people and animals), LI (for liking and love), MB (material and financial needs), BZ(Sz) (to achieve goal situation Sz), NA (to have children), BH(OK) (to help object OK).

2. Notations and Functions used in my Patent Description [AS1]

We use, in this paper, following notions and functions described in my paper [AS I] (2000), Artificial creature vP has a set Bd(vP) of needs. To Bd(vP) belong e.g. GR (belong to communities), MA (have power), MB (material and financial needs), BZ(Sz) (achieve goal situation Sz).

The state of tension (desire) and satisfaction of vP, with respect to need b, at time 1, is given by two functions:

$$0 \leq des(vP,b,t) \leq 60, -30 \leq bef(vP,b,t) \leq 30, \text{ for } b \in Bd(vP)$$

where des(vP,b,t) is the intensity of desire and bef(vP,b,t) the intensity of satisfaction (or dissatisfaction) of vP, with respect to need b, at time t. These functions have the following properties.

i. Increasing function bef(vP,b,t) means vP satisfies his/her need b (positive stimulus) and is perceived by vP with approval, joy or happiness.

ii. When bef(vP,b,t)<0 and does not increase then vP perceives bef(vP,b,t) as a negative stimulus (disappointment, annoyance, sadness, suffering) with respect to need b. Decreasing bef(vP,b,t)<0 means stronger negative stimulus with regard to need b.

iii. des(vP,b,t) is the intensity of desire of vP to satisfy need b at time L. The greater des(vP,b,t) the greater is the desire of vP to satisfy need b. des(vP,b,t)<0.5 means 'need b of vP is well satisfied at time t'.

iv. The greater des(vP,b,t) the greater is the approval and joy of vP when bef(vP,b,t) increases, and the greater is the dissatisfaction, annoyance and grief of vP when bef(vP,b,t)<0 and decreases.

Artificial creature vP has models of objects and situations (OSM) of his/her/its surrounding, and models (schemes) of activities (behaviours, operations, procedures) which vP may execute. Object, situation or activity, OSA, has the same structure as its object, situation or activity model, respectively. Stimulus patterns. In model OSM (and OSA) stimuli are represented by patterns (called stimulus patterns) of the following form:

$$(2.1)\ ([°|(Nba, Nb),]fs(vP,b)=([°|p;]n;(y1,z1),\ldots,(yn,zn);\ q\ ht)\ [°|/z\ eu][°|;OSM1.Ej]\ [°|;\ \text{where } C])$$

where [tex1|...|texk] denotes one of the words tex1, ..., texk, ° is the empty word, Nba, Nb and n are natural numbers, $NBa \leq Nb$, $1 \leq n \leq 10$), fs denotes name of a stimulus pattern, $0 \leq p \leq 1$, $-30 \leq yi \leq 30$, $-55 \leq zi \leq 60$, yi and zi are simple arithmetical expressions, q hi denotes a time period (e g: 0.5 h, 3 days, 1 week), $n*q\ ht \leq 720\ h$, $z>0$, eu denotes a measure (e g kg, g, h, km, m, l) and e g/200 g denotes 'pro 200 g'. Nba/Nb is the probability that the pattern fs(vP,b)=( ... ) is valid. C is a condition. If C occurs then [°|(Nba,Nb),]fs(vP,b)=( ... ) can be applied only if C is true. If OSM1.Ej occurs then the pattern fs(vP,b)=( ... ) concerns the pattern Ej=('ds',( ... fse(vP,b)=...)) in OSM1. Example of a pattern (fs=epb) occurring in OSM:

$$(2.2)\ epb(vP,b)=(n;(y1,z1),\ldots,(yn,zn);q\ ht)\ [°|/\ z\ eu]$$

where yn>1+y1 and z1>1+zn. The meaning: vP can execute (time t) an activity, AV, such that when vP uses OSM in AV then vP expects that OSM will increase bef(vP,b,.) and decrease des(vP,b,.) according to the pattern (2.2). Exact description of all patterns and their meanings is given in Schurmann [AS1], Sect. 2.2.

Intensity of stimulus. Expected (by vP, at time t) intensity of positive stimulus of pattern (2.1) is given by epr(vP,OSM, fsp,b, ... ,t) (defined in [AS1], Sect. 2.3.1), where fsp denotes the following (positive) pattern names: epb, upb, vnb, epbu, upbu. Let fsn denotes the following names of (negative) patterns: enb, unb, enbu, unbu, vpb, vnb. Expected (by vP, at time t) intensity of negative stimulus of the pattern (2.1) (where fs=fsn) is given by enr(vP,OSM, fsn,b, ... ,t) (defined in [AS1], Sect. 2.3.2). The intensity of positive stimulus of OSM (time t) is given by $$pros(vP,OSM,t)=\Sigma_{b \in Bp}\ epr(vP,OSM,fsp,b,\ldots,t)$$

where Bp={b∈ WB|( ... fsp(vP,b)=.) is in OSM}, WB={b∈ Bd(vP)|des(vP,b,t)>0.33* mdes(vP,t) } and mdes(vP,t)=max (des(vP,b,t), for b ∈ Bd(vP)). The intensity of negative stimulus of OSM (time t) is given by:

$$nros(vP,OSM,t)=\Sigma_{b\in Bn}enr(vP,OSM,fsn,b,\ldots,t)$$

where $Bn=\{b\in WB|(\ldots fsn(vP,b)=\ldots)$ is in OSM$\}$A. The intensity of stimulus of OSM at time t (s. [AS1], Sect. 2.3.3):

$$rosa(vP,OSM,t)=pros(vP,OSM,t)-nros(vP,OSM,t).$$

Intensities of feelings. The states of feelings of vP: contentment, joy, happiness, dissatisfaction, annoyance and suffering, with respect to need b, at time t, are represented by function values zful(vP,b,t) (how they are determined is described in [AS1], Sect. 3). zful(vP,b,t) is interpreted as follows:

$0\leq$zful(vP,b,t)—the intensity of contentment (the small values), joy (the middle values), happiness (the great values) of vP, with regard to need b;

$0>$zful(vP,b,t)—the intensity of dissatisfaction (the greater values), annoyance, grief, sadness and suffering (the smaller values) of vP with regard to need b.

Intensities of liking, affection, love, dislike, annoyance and anger to/for an object, a situation or an activity (OS4) are given by two functions (how they are determined is described in [AS1] Sect. 4):

zulieb(vP,OSA,t)—the intensity of liking, affection and love of vP to/for OSA at time t—the greater this value the stronger is the positive feeling of vP to OSA;

abhas(vP,OSA,t)—the intensity of dislike, aversion and anger of vP to/for OSA at time t—the greater this value the stronger is the negative feeling of vP to OSA.

3. Determination of bef(vP,b,t) and des(vP,b,t) by Stimulus Patterns

Artificial creature vP has a set WPI(vP) of perceiving procedures which identify objects, situations and activities in the surrounding of vP. WPI(vP) contains procedures for: visual identification of objects and situations, identification of artificial creatures and real persons by names and passwords, perceiving objects by touch, syntactic and semantic identification of clauses. vP sends intensities of desires, satisfactions and emotions, to other artificial creatures, as values des(vP,b,t), bef(vP,b,t), zful(vP,b,t), zulieb(vP,OS4,t), abhas(vP,OSA,t), . . . . To people, vP expresses these values by clauses.

In this section we consider the determination of values bef(vP,b,t) and des(vP b,t) by stimulus patterns occurring in situation and activity models. For needs b in {GE (be healthy), LE (be alive), KS (have no pain), NU (be in normal environment), SH (visual beauty)}, these values are determined only by stimulus patterns. When vP perceives an object, Ob, then Ob is a component of a situation, S(Ob), which vP has perceived. The alteration of bef(vp,b,t) and des(vP,b,t), caused by object Ob in situation S(Ob), is determined by S(Ob). Therefore, we consider (in this section) only changes of bef(vP,b,t) and des(vP,b,t) caused by situations and activities. Object and situation models, OS, may contain several stimulus patterns ( . . . fsj(vP,b)=. . . where Cj), for j=1, . . . j1. Cj may have the form in AF1^. . . This means: this pattern is valid only when OS is in activity AF1.

When vP has identified, by procedures in WPI(vP), that he/she/it is in new situation, SMn, which contains stimulus pattern . . . efs(vP,b)= . . . , then values bef(vP,b,t) and des(vP,b,t) are determined by this pattern (as shown below) if its priority is actually high enough, where efs differs from upb, unb, upbu, unbu. For this purpose, we associate to each stimulus pattern, in situation or activity model, a priority number as follows: (pr='r, (Nba, Nb), s(vP,b)=. . . ), where r equals 1 or 2 and determines the priority of this stimulus pattern.

3.1. Determination of bef(vP,b,t) and des(vP,b,t) when vP has perceived a situation Case: In situation model SMn is, for need b, only one pattern of the form (3.1) (pr='r, (Nba, Nb), efs(vP,b)=(n;(y1,z1), . . . , (yn, zn); q ht) [°|/ z eu [°|; where C]) valid (i e condition C is true) at time t, where efs denotes epb, epbu, enb, enbu. If r=1 then pattern (3.1) is applied, with probability Nba/Nb, to calculation of values bef(vP,b,t+i*q ht) and des(vP,b,t+i*q ht) (i=1, . . . il$\geq$n) by the method given in Schurmann [AS1] (2000), Sect. 2.2. 'Pattern (3.1) is applied with probability p' means: (3.1) is applied if los(1,a)=1 (if los(1,a)=0 then (3.1) is not be applied), where a[1]=p and los is defined as follows:

function los(k: integer, var ap: array[1 . . . 40] of real): integer;

var i: inleger; const am: array[1 . . . 40] of char=('a'. . . 'z','0'. . . '9', '+', '−', '/', ':');

begin Ur:=box with 10000 not marked balls;

for i:=I to k do begin mark ap[i]*10000 not marked balls with the sign am[i] end;

choose randomly a ball from Ur;

if the chosen ball is not marked then los:=0 else begin i:=0; repeat i:=i+1 until (the chosen ball is marked with the sign am[i]);

los:=i end end los.

If in (3.1) r=2 (the priority) and bef(vP,b,t+q ht) and des(vP,bt+q ht) are not determined or determined by a stimulus pattern with priority 2 then pattern (3.1) is applied, with probability Nba/Nb, to calculation of values bef(vP,b, t+e*q ht) and des(vP,b,t+e*q ht) (e=1, . . . ,e1$\geq$n) as in the case where r=1. If in (3.1) r=2 and bef(vP,b,t+q ht) and des(vP,b,t+q ht) are determined by a pattern with priority 1 then pattern (3.1) is not applied at time t.

Case: In situation SMn, for need b (and the pattern in SV.EvI), occurs only one pattern of the form ('pr='r, (Nba, Nb), vsb(vP,b)=(p; n;(y11,z11), . . . , (y1n,z1n); q ht) [°|/ z eu]; SV.Ev1 [°|; where C])

where s denotes the letter 'n' or 'p', SV is a situation or activity model, C is true and ('pr='r, (N1a, N1), esb(vP,b)= (n;(y1,z1), . . . , (yn,zn); q ht) [°|/z eu] °|; where C1]) occurs in SV.Ev1. If bef(vP,b,t+k*q ht) and des(vP,b,t+k*q ht) are determined by the pattern in SV.Ev1, for k=1, . . . ,m, then execute the following operations, with probability Nba/Arb (i.e. if los(1,a)=1 and a[1]=Nba/Nb):

bef(vP,b,t+j*q ht)=bef(vP,b,t+j*q ht)+p*(y11−y1);

des(vP,b,t+j*q ht):=des(vP,b,t+j*q ht)+p*(z11−z1) for j=1, . . . ,m−n;

bef(vP,b,t+(m−n+i)*q ht):=bef(vP,b,t+(m−n+i)*q ht)+p* (y1i−yi);

des(vP,b,t+(m−n+i)*q ht):=des(vP,b,i+(m−n+i)*q ht)+p* (z1i−zi) for i−1, . . . ,n.

Case Following m patterns occur in SMn for need b (3.2) (pr='r, (Nbaj, Nb), efsj(vP,b)=(nj;(yj2, zj1), . . . ,(yjnj, zjnj); qj ht) [°|/zj euj] [°|; where Cj]), fur j=1, . . . ,m, where efsj denotes epb, epbu, enb, enbu, Nba1+. . . +Nbam$\leq$Nb and condition Cj holds at time t. If r=1 or r=2 and bef(vP,b,t+xt) und des(vP,b,t+xt) (xt>0) are not determined by pattern with priority 1 then execute the following operations:

a[j]:=Nbaj/Nb, for=1, . . . ,m;

e:=los(m,a) {pattern e has been chosen if e>0};

if e=0 then ignore all patterns (3.2) (no pattern is applied);

if e>0 then calculate values bef(vP,b,t+k*qe hte) and des(vP,b,t+k*qe hte) by the pattern efse(vP,b)=(ne; (ye1,ze1), . . . (in the same way as by pattern (3.1))

3.2. Determination of Values bef(vP,b,t) and des(vP,b,t) when an Activity is Executed bef(vP,b,t) and des(vP,b,t) change when vP executes activity or an activity uses vP (as an object). Model of an activity (or activity scheme, in short: activity) has the following form AV begin {Ea1; . . . ;Eam}; (SG,KA) end where Eai denotes a property (e g stimulus pattern) of the activity AV and (SG,KA) is a directed graph, without isolated nodes, where nodes are situation models. To each edge (SMi, . . . ,SMj) (in KA) is associated sub-activity sbeh(SMi,SMj)=((Nja, Nj), fADij, Dsij)

where fADij is a sequence of elementary activities and operations which lead, with probability Nja/Nj, from situation SMi to situation SMj (when this sequence is executed) and Dsij is a set of stimulus patterns. Activities (behaviour schemes) are described more exactly in Schurmann [AS3] (1998), Sect. 4.1.

When activity AV is executed (by vP) then bef(vP,b,t) and des(vP,b,t) are determined as follows When vP is in situation SMi and (SMi,SMje) (for e≦e1) are in KA then vP executes a sub-activity sbeh(SMi,SMjn)=((Njna, Njn), fADijn, Dsijn) (i e a sequence of elementary activities belonging to fADijn) and achieves in this way next situation SMjn. bef(vP,b,t+xt) und des(vP,b,t+xt) are determined, at first, by stimulus patterns in Dsijn and after that by patterns occurring in SMjn, as described in Sect. 3.1

4. Intensities bef(vP,b,t) und des(vP,b,t) in Standard Situations

In this section are described methods for determining bef(vP,b,t+xt) and des(vP,b,t+xt) for needs AU, NE, GR, MA, LI, MB, NA, BZ(Sz) and BH(OK).

bef(vP,AU,t); AU—need for attention and identification. bef(vP,AU,t) changes in following cases (a1) caused by time and depending on state of relaxation of vP, (a2) when perceiving objects and situations, (a3) when executing activities. In (a1) is determined the ground attention AU of vP after a sleep. The greatest attention is perceived neither as pain nor as grief $-4 \leq cau \leq bef(vP,AU,t) \leq oau \leq 25$, $cau<2$, $5 \leq oau$.

Attention (a2) and (a3) is directed to objects, situations and elementary activities/operations When des(vP,AU,t) increases (decreases) then the attention of vP increases (decreases, respectively). The behaviour 'sleep' increases bef(vP,AU,t) up to oau—0.5. We distinguish the following kinds of attention.

AUw(UOS)—attention when vP is identifying surrounding, object or situation UOS,

AUa(AVe)—attention when vP is executing (elementary) activity/operation AVe.

The following rules AU1, . . . ,AU3 have priority 1.

AU1 Let ts denotes the time 5 min after good sleep of vP. The ground attention of vP is determined as follows bef(vP,AU,ts)=oau −2, des(vP,AU,ts)=5.

Every r min (after time ts) are performed the following operations dau1 bef(vP,AU,ts+(i−1)*r min)+gda*sqrt(i*2)*(oau+5−bef(vP,AU,ts+(i−1)*r min));

dau2.=−ga1*sqrt(8+des(vP,ES,ts+1*r min); dau:=dau1+dau2;

bef(vP,AU,ts+i*r min):=max(min(dau, oau−1.5), cau);

des(vP,AU,ts+i*r min).=2.1*(oau−bef(vP,AU,ts+1*rmin); for i=1, . . . ,i1≦865

(3 days=24 h*3=72*60 min, 72*60/5=864), where $1 \leq r \leq 20$, ES denotes the need for relaxation, $0.001 \leq gda \leq 0.1$, $0.1 \leq ga1 < 1$ (sugg.: r=5, gda=0.011, gal=0.4, oau=20, cau=−3)

AU2. vP has noticed (at time t) a new object or situation, OS, in part TUs of surrounding U(vP,t). The intensity of attention AUw directed to TUv equals:

$bef(vP,AUw(TUs),t):=bef(vP,AU,t)-3$; $des(vP,AUw(TUs),t):=2.1*(oau-bef(vP,AUw(TUs),t))$.

OS may be also a sequence of words which denotes an object, a situation or an activity AU2.1. When vP identified (time t1) object or situation OS in TUs (thus vP has sufficient exact model of OS) then:

bef(vP,AUw(TUs),t1).=bef(vP,AU,t1); des(vP,AUw(TUs),t):=des(vP,AU,t1);

aw1.=gau*sqrt((des(vP,UA,t1)+0.2)*(0.333+max(pros(vP,OS,t1), nros(vP,OS,t1))));

if aw1≦oau−cau then bef(vP,AUw(OS),t1).=oau−2−aw1 else bef(vP,AUw(OS),t1).=cau−2;

des(vP,AUw(OS),t1).=2.1*(oau−bef(vP,AUw(OS),t1));

where AUw(OS) is the attention directed to OS, $0.01 \leq gau \leq 0.1$ (sugg. gau=0.0317). After vP finished observation of OS (time t2) in his/her/its surrounding U(vP,t2) then:

$bef(vP,AUw(OS),t2):=oau-0.5$; $des(vP,AUw(OS),t2):=1$.

AU2.2 When vP is not able to identify OS (i e vP cannot associate with OS an appropriate model) then.

$bef(vP,AUw(OS),t1)=bef(vP,AU,t1)-2.5$; $des(vP,AUw(OS),t1):=2.1*(oau-bef(vP,AUw(OS),t1))$.

When vP has build model, OSM, of OS then determine values bef(vP,AUw(OS),t1) and des(vP,AUw(OS),t) as given in AU2 1. If vP has not build model of OS (time t3) then:

$bef(vP,AUw(TUs),t3):=bef(vP,AU,t3)$; $des(vP,AUw(TUs),t3):=1.5*(oau-bef(vP,AU,t3))$;

$bef(vP,AUw(OS),t3):=max(bef(vP,AU,t3), 1)$; $des(vP,AUw(OS),t3).=1.5*(oau-bef(vP,AU,t3))$.

AU3 vP executes activity, AVa, different from a passive activity like 'sleep' or 'lie relaxed' The attention of vP is directed to sub-activity sbeh(SMi,SMj)=(.fADij,Dsij) which vP is executing, where fADy is the sequence of elementary activities which vP is executing and Dsij is the set of stimulus patterns connected with activities in fADij. The following operations are performed before execution offADij (where gau is given in AU2.1):

aw1.=gau*sqrt((des(vP,UA,t)+0.2)*(0.333+max(pros(vP,Dsij,t), nros(vP,Dsij,t))));

if aw1≦oau−cau then bef(vP,AUa(fADij),t):=oau−2−aw1 else bef(vP,AUa(fADij),t):=cau−2;

des(vP,AUa(fADij),t).=2.1*(oau−bef(vP,AUa(fADij),t));

aw2.=gau*sqrt((des(vP,UA,t)+0.2)*(0.333+max(pros(vP,SMj,t), nros(vP,SMj,t))));

if aw2≦oau−cau then bef(vP,AUw(SMj),t)=oau−2−aw2 else bef(vP,AUw(SMj),t).=cau−2;

des(vP,AUw(SMj),t)=2.1*(oau−bef(vP,AUw(SMj),t)).

After vP has executed activities fADO (time t1) then $$bef(vP,AUa(fADij),t1).=oau-1.5;\ des(vP,AUa(fADij),t1):=3.$$

After vP finished observation of SMj (time t2) then.

$$bef(vP,AUw(SMj),t2):=oau-0.5;\ des(vP,AUw(SMj),t2):=1.$$

bef(vP,NE,t); NVE—curiosity and need for knowledge. There are 3 kinds of the need NE:

NEw(OS)—when vP perceives object or situation OS,

NEk(OSM)—need for knowledge of object or situation model OSM and models associated with OSM, NEz(SM)—how can situation SM be achieved.

We assume that vP has a set (KAO) of cognition algorithms and operations. Examples: for building visual representation of object or situation, algorithms for perceiving properties of objects and situations (e g touch properties of an object, motion properties), algorithms for naming objects, situations and activities (situation can be named by a clause—as described in Schurmann [AS2] (1999)), algorithms for verifying and (eventual) correcting consistency and completeness of object and situation models, algorithms for reasoning about surrounding of vP (some such algorithms are given in Schurmann [AS3] (1998)).

Below, x denotes letters w, k or z in the contexts NEx, onx, cnx, rnx. Let $3 \leq one \leq 20$ and $-12 \leq cne > 0$, where one, cne depend on vP. It holds:

$$-0.6*nx \leq cnx(arg) \leq bef(vP,NEx(arg),t) < onx(arg) \leq rnx.$$

NE1. Every 55 days are executed (with priority 3) the following operations:

$$onx(arg).=\max(onx(arg)-dn1,\ 0.6);\ cnx(arg):=\min(cnx(arg)+0.6*dn1,\ 0);$$

$$bef(vP,NEx(arg),t).=\min(bef(vP,NEx(arg),t)+dnb,\ onx(arg));$$

$$des(vP,NEx(arg),t).=\max(des(vP,NEx(arg),t)-2.2*dnb,\ 0.2);$$

where $0.01 \leq dn1 \leq 1$ and $0.05 \leq dnb \leq 4$ (sugg.dn1=0.2, dnb=0.25).

The following rules NEw1, . . . ,NEz2.3 have priority 2. Assume, vP has noticed (at time t) new object or situation, OS, in his/her/its surrounding U(t).

NEw1 When vP has identified OS as model OSM (i e the result of algorithms for identification is 'OSM is good model of OS') and has not identified any new property of OS then do not change bef(vP,NEw(OSM),t) and des(vP,NEw(OSM),t).

NEwk1.1. When vP has identified OS as model OSM and the result of identification algorithms is 'OS has new property En' then.

$$dnw:=onw(OSM)-cnw(OSM);\ Nw1=gn1*sqrt(dnw)*1n(1.1+0.2*(bef(vP,NEw(OSM),t)-cnw(OSM)));$$

$$bef(vP,NEw(OSM),t)=\max(bef(vP,NEw(OSM),t)-Nw1,\ cnw(OSM));$$

$$des(vP,NEw(OSM),t)=\min(des(vP,NEw(OSM),t)+1.8*Nw1,\ 2*dnw);$$

where $0.01 \leq gn1 \leq 1$ (sugg.: gn1=0.34)

NEwk1.2. When the property En (mentioned in NEwk1.1) has been entered in the model OSM by appropriate perceiving algorithm (time t1) then.

$$dnk.=onk(OSM)-cnk(OSM);\ Nw1.=gn2*sqrt(dnk)*In(1.1+0.2*(bef(vP,NEk(OSM),t1)-cnk(OSM)));$$

$$bef(vP,NEw(OSM),t1)=\max(bef(vP,NEw(OSM),t)-Nw1,\ cnw(OSM));$$

$$des(vP,NEk(OSM),t1):=\min(des(vP,NEw(OSM),t1)+1.8*Nk1,\ 2*dnw);$$

where $0.01 \leq gn2 \leq 1$ (sugg. gn2=0.34).

NEwk1.3. If, after the new property En (mentioned in NEwk1.1) has been entered into OSM, the result of applied consistence algorithms (time t2) is 'no essential inconsistency of the model OSM is found' then:

$$onw(OSM):=\min(onw(OSM)+an1,\ rnw);\ cnw(OSM).=\max(cnw(OSM)-0.6*an1,\ -0.6*rnw);$$

$$dnw.=onw(OSM)-cnw(OSM);\ Nw2.=gnw*sqrt(dnw)*ln(1.1+0.2*(onw(OSM)-bef(vP,NEw(OSM),t2)));$$

$$bef(vP,NEw(OSM),t2):=\min(bef(vP,NEw(OSM),t2)+Nw2,\ onw(OSM));$$

$$des(vP,NEw(OSM),t2).=\max(des(vP,NFw(OSM),t2)-1.6*Nw2,\ 1);$$

$$onk(OSM):=\min(onk(OSM)+an1,\ rnk);\ cnk(OSM):=\max(cnk(OSM)-0.6*an1,\ -0.6*rnk);$$

$$dnk.=onk(OSM)-cnk(OSM);\ Nk2.=gnw*sqrt(dnk)*1n(1.1+0.2*(onk(OSM)-bef(vP,NEk(OSM),t2)));$$

$$bef(vP,NEk(OSM),t2).=\min(bef(vP,\ NEk(OSM),t2)+Nk2,\ onk(OSM));$$

$$des(vP,NEk(OSM),t2):=\max(des(vP,NEk(OSM),t2)-1.6*Nk2,\ 1);$$

where $0.01 \leq gntw \leq 1$, $0.05 \leq an1 \leq 1$ (sugg.: gnw=0.33, an1=0.25).

NEwk1.4. If, after the new property En (mentioned in NEwk1.1) has been entered into OSM, the result of applied consistence algorithms (time t2) is 'the model OSM is not consistence with/because.', then $$onw(OSM)=\max(onw(OSM)-0.7*an1,\ 0.6);\ cnw(OSM).=\min(cnw(OSM)+0.5*an1,\ 0);$$

$$dnw:=onw(OSM)-cnw(OSM);\ Nw2:=gnw*sqr1(dnw)*1n(1.1+0.2*(onw(OSM)-bef(vP,NEw(OSM),t2)));$$

$$bef(vP,NEw(OSM),t2).=\min(\max(bef(vP,NEw(OSM),t2)+0.2*Nw2,\ cnw(OSM)),\ onw(OSM));$$

$$des(vP,NEw(OSM),t2).=\min(\max(des(vP,NEw(OSM),t2)-0.8*Nw2,\ 0.2),\ 1.6*dnw);$$

$$onk(OSM).=\max(onk(OSM)-0.7*an1,\ 0.5);\ cnk(OSM).=\min(cnk(OSM)+0.5*an1,\ 0);$$

$$dnk.=onk(OSM)-cnk(OSM);\ Nk2=gnw*sqrt(dnk)*1n(1.1+0.2*(onk(OSM)-bef(vP,NEk(OSM),t2)));$$

$$bef(vP,NEk(OSM),t2).=\min(\max(bef(vP,NEk(OSM),t2)+0.2*Nk2,\ cnk(OSM)),\ onk(OSM));$$

$$des(vP,NEk(OSM),t2)=\min(\max(des(vP,NEk(OSM),t2)-0.8*Nk2,\ 0.2),\ 1.6*dnk);$$

where $0.01 \leq gnw \leq 1$, $0.05 \leq an1 \leq 1$ (sugg.: gnw=0.33, an1=0.25)

NEwk2. If identification of OS has resulted in 'vP has no good model of OS; the best model of OS is OSMu' (time t) then:

build model, OSMs, of OS;

$$onw(OSM):=\min(onw(OSMu)+an1,\ rnw);$$

$$cnw(OSMs)=\max(cnw(OSMu)-0.6*an1,\ -0.4*rnw);\ dnw:=onw(OSMs)-cnw(OSMs);$$

$$bef(vP,NEw(OSMs),t):=onw(OSMs)-0.3*dnw;\ des(vP,NEw(OSMs),t)=0.5*dnw;$$

$onk(OSMs):=\min(onk(OSMu)+an1, rnk); cnk(OSMs):=\max(cnk(OSMu)-0.6*an1, -0.4*rnk);$ $dnk.=onk(OSMs)-cnk(OSMs); bef(vP,NEk(OSMs),t):=onk(OSMs)-0.3*dnk;$ $des(vP,NEk(OSMs),t):=0.5*dnk.$ Property En in NEwk1.1, . . . ,NEwk1.4 and OS in NEwk2 may be a sequence, fws, of words, e g room, person rides a horse. If OS in NEwk2 is a word sequence fws then model, representing the meaning of fws, is built, where fws is the name of this model (semantic of such clauses is outlined in Schurmann [AS2], (1999)).

NEwk3.1 If the result of algorithms for consistency and completeness which were applied to model OSM and models related to OSM (time t) is 'inconsistency and incompleteness of the model OSM is not found' then.

$onw(OSM)=\min(onw(OSM)+an1, rnw); cnw(OSM):=\max(cnw(OSM)-0.6*an1, -0.6*rnw);$ $bef(vP,NEw(OSM),t):=\min(bef(vP,NEw(OSM),t)+1.6*Nw2, onw(OSM));$ $des(vP,NEw(OSM),t):=\max(des(vP,NEw(OSM),t)-2.6*Nw2, 1);$ $onk(OSM):=\min(onk(OSM)+an1, rnk); cnk(OSM)=\max(cnk(OSM)-0.6*an1, -0.6*rnk);$ $bef(vP,NEk(OSM),t)=\min(bef(vP,NEk(OSM),t)+1.6*Nk2, onk(OSM));$ $des(vP,NEk(OSM),t) \max(des(vP,NEk(OSM),t)-2.6*Nk2, 1);$ where Nw2 and Nk2 are given in NEwk1.3.

NEwk3.2. If the result of algorithms for consistency and completeness which were applied to model OSM and models related to OSM (at time t) is: 'model OSM is not consistence with/because . . . ' or 'model OSM is not complete', then:

$onw(OSM).=\max(onw(OSM)-1.4*an1, 0.6); cnw(OSM):=\min(cnw(OSM)+an1, 0);$ $dnw, Nv2$ and $bef(vP,NEw(OSM),t2)$–as in NEwk1 4;

$des(vP,NEw(OSM),t2):=\min(\max(des(vP,NEw(OSM),t2)-1.4*Nw2, 0.2), 1.6*dnw);$ $onk(OSM):=\max(onk(OSM)-1.4*an1, 0.5); cnk(OSM):=\min(cnk(OSM)+an1, 0);$ dnk, Nk2—as in NEwk1.4, $bef(vP,NEk(OSM),t2):=\min(\max(bef(vP,NEk(OSM),t2)+0.1*Nk2, cnk(OSM)), onk(OSM));$ $des(vP,NEk(OSM),t2):=\min(\max(des(vP,NEk(OSM),t2)-1.5*Nk2, 0.2), 1.5*dnk);$ NEw2.1. When (i) vP executed cognition activity AVE1 (in time (t1,t2)) in order to know whether model OSM have property Em, (ii) the execution of AVE1 decreased bef(vP,be,t1) by ds(be) or prevented the increase of bef(vP,be,t1) by ds(be), for e=1, . . . u, (iii) vP did not find out whether OSM has or has not the property Em, then:

(4.1.1) $KA(Em,AVEi)=des(vP,b1,t2)*ds(b1)+\ldots+des(vP,bu,t2)*ds(bu);$ (4.1.2) if gKA (Em) is not entered in OSM then gKA (Em):=KA(Em,AVEt) else gKA(Em):=gKA(Em)+KA (Em, AVEt); enter gKA(Em) into OSM;

$Nw3:=gnw1*\ln(1.1+0.2*(bef(vP,NEw(OSM),t2)-cnw(OSM)))*(0.2+sqrt(gKA(Em)));$ $bef(vP,NEw(OSM),t2):=\max(bef(vP,NEw(OSM),t2)-Nw3, cnw(OSM));$ $des(vP,NEw(OSM),t2).=\min(des(vP,NEw(OSM),t2)+1.4*Nw3, 2*(onw(OSM)-cnw(OSM));$ where $0.04 \leq gin1 \leq 0.7$ (sugg.gnw1=0.15).

KA(Em,AVEi) can be equal to 0. Example of a cognition activity. vP get information about OSM from a person, from vPa or a book NEw2.2. If conditions (i) and (ii) in NEw2.1 hold and the result of the activity AVEi is either 'OSM has the property Em' or 'OSM has not the property Em' then, execute operations (4.1.1) and (4.1.2), $Nwo:=gwo*\ln(1+rnw-onw(OSM))*(0.2+sqrt(gKA(Em)));$ $onw(OSM).=\min(onw(OSM)+Nwo, rnw); cnw(OSM).=\max(cnw(OSM)-0.7*Nwo, -0.6*rnw);$ $Nw4.=gnw2*\ln(1.1+0.2*(onw(OSM)-bef(vP,NEw(OSM), t2)))*(0.2+sqrt(gKA(Em)));$ $bef(vP,NEw(OSM),t2).=\min(bef(vP,NEw(OSM),t2)+Nw4, onw(OSM));$ $des(vP,NEw(OSM),t2).=\max(des(vP,NEw(OSM),t2)-1.7*Nw4, 1);$ where $0.005 \leq gwo \leq 0.1$, $0.02 \leq gnw2 \leq 0.8$ (sugg: gwo=0.035, gnw2=0.19)

NEw2.3. When vP concludes (time $t3 \geq t2$) that she/he/it cannot execute more cognition activities AVEt in order to know whether OSM should have the property Em then:

$Nwo1.=gwo1*\ln(1+onw(OSM)-cnw(OSM))*(0.2+sqrt(gKA(Em)));$ $onw(OSM):=\max(onw(OSM)-Nwo1, 0.6); cnw(OSM):=\min(cnw(OSM)+0.6*Nwo1, 0);$ $bef(vP,NEw(OSM),t3):=\min(\max(bef(vP,NEw(OSM),t3), cnw(OSM)), onw(OSM));$ $des(vP,NEw(OSM),t3):=\min(des(vP,NEw(OSM),t3)-gnw3*\ln(1.1+des(vP,NEw(OSM),t3))*(0.2+sqrt(gKA(Em))),1)$ where $0.005 \leq gwo1 \leq 0.1$, $0.02 \leq gnw3 \leq 0.9$ (sugg:gwo1=0.035, gnw3=0.24).

NEwk4. When (i) cognition algorithms of vP found out that object models M(O1), . . . ,M(On) have properties E1, . . . ,Eu (u>1, n>3), (ii) vP has built generalized object model M(Og) having the properties E1, . . . ,Eu, then $onw(M(Og))=\max(onw(M(Oi)),$ for $0<i \leq n); cnw(M(Og)):=-0.6*onw(M(Og));$ $dnw.=onw(M(Og))-cnw(M(Og));$ $bef(vP,NEw(M(Og)),t).=onw(M(Og))-0.15*dnw; des(vP,NEw(M(Og)),t):=0.3*dnw);$ $onk(M(Og)).=\max(onk(M(Oi)),$ for $0<i-n); cnk(M(Og)):=-30.6*onk(M(Og));$ $dnk.=onk(M(Og))-cnk(M(Og));$ $bef(vP,NEk(M(Og)),t).=onk(M(Og))-0.2*dnk; des(vP,NEk(M(Og)), t).=0.36*dnk).$ bef(vP,NEz(SM),t). Let ES(t) be the set of situations (i e situation models) which vP can achieve in the present time, and SMz situation which does not belong to ES(t) and which vP wants to achieve.

NEz1. If onz(SMz), bef(vP,NEz(SMz),t) are not defined then:

$onz(SMz):=\min(onw(SMz), 0.6*rnz); cnz(SMz).=-0.6*onz(SMz); Bd(vP).=Bd(vP)\cup\{NEz(SMz)\};$ $bef(vP,NEz(SMz),t) := onz(SMz) - 0.2*(onz(SMz) - cnz(SMz));\ des(vP, NEz(SMz),t) = 0.36*(onz(SMz) - cnz(SMz))$.

NEz2.1. When (i) vP executed activity (e g cognition algorithms) AKA (in time (t1,t2)) in order to build new activity AVSz such that the execution of AVSz leads from at least one situation in ES(t1) to the situation SMz, (ii) the execution of AKA decreased bef(vP,be,t1) by ds(be)>0 or prevented the increase of bef(vP,be,t1) by ds(be), for e=1..., (iii) vP could not build activity AVSz by activity AKA, then (4.2 1) $AK(AVSz,AKA) = des(vP,b1,t2)*ds(b1) + \ldots + des(vP,bu,t2)*ds(bu)$;

(4.2.2) if gAK(AVSz) is not entered in SMz then gAK(AVSz):=AK(AVSz,AKA)

else $gAK(AVSz) := gAK(AVSz) + AK(AVSz,AKA)$; enter $gAK(AVSz)$ into $SMz$;

$Nz1 := gnz*1n(1.1 + 0.2*(bef(vP,NEz(SMz),t2) - cnz(SMz)))*(0.2 + sqrt(gAK(AVSz)))$;

$bef(vP,NEz(SMz),t2) := max(bef(vP,NEz(SMz),t2) - Nz1, cnz(SMz))$;

$des(vP,NEz(SMz),t2) := min(des(vP,NFz(SMz),t2) + 1.6*Nz1, 2*(onz(SMz) - cnz(SMz)))$;

where $0.05 \leq gnz \leq 0.7$ (sugg gnz=0.17).

NEz2.2. When conditions (i), (ii) in NEz2.1 hold and vP has built activity AVSz by AKA then: execute operations (4 2 1) and (4 2 2);

$Nzo := gzo*1n(1 + rnz - onz(SMz))*(0.2 + sqrt(gAK(AVSz)))$;

$onz(SMz) := min(onz(SMz) + Nzo, rnz)$; $cnz(SMz) := max(cnz(SMz) - 0.7*Nzo, -0.6*rnz)$;

$Nz2 := gnz2*1n(1.1 + 0.2*(onz(SMz) - bef(vP,NEz(SMz),t2)))*(0.2 + sqrt(gAK(AVSz)))$;

$bef(vP,NEz(SMz),t2) := min(bef(vP,NEz(SMz),t2) + Nz2, onz(SMz))$;

$des(vP,NEz(SMz),t2) := max(des(vP,NEz(SMz),t2) - 1.8*Nz2, 1)$;

where $0.005 \leq gzo \leq 0.15$, $0.02 \leq gnz2 \leq 0.7$ (sugg.: gzo=0.035, gnz2=0.19).

Ez2.3. When vP concludes (time $t3 \geq t2$) that he/she/it cannot execute more activities of the kind AKA in order to build activity AVSz then.

$Nzo1 := gzo1*1n(1 + onz(SMz) - cnz(Smz))*(0.1 + sqrt(gAK(AVSz)))$;

$onz(SMz) := max(onz(SMz) - Nzo1, 0.6)$; $cnz(SMz) := min(cnz(SMz) + 0.6*Nzo1, 0)$;

$bef(vP,NEz(SMz),t3) := max(min(bef(vP,NEz(SMz),t3), onz(SMz)), cnz(SMz))$;

$des(vP,NEz(SMz),t3) := max(des(vP,NEz(SMz),t3) - gn3*1n(1.1 + des(vP,NEz(SMz),t3))*(0.2 + sqrt(gAK(AVSz))), 1)$;

where $0.005 \leq gzo1 \leq 0.1$, $0.02 \leq gn3 \leq 0.9$ (sugg.: gzo1=0.035, gn3=0.24).

Situation SMa in ES(t) and SMz may have the following meanings: SMa–'vP has objects O1, ..., Ok', SMz–'object Ogb is built from objects O1, ..., Ok'. AVSz is then the activity (the method) which builds the object Ogb from objects O1, ..., Ok.

bef(vP,GR,t); GR—to belong to communities. Below, instead of GR we use GR(G)—the need to belong to community G. Each community G has a set NRV(G) of norms, principles, rules and behaviour schemes (models) which ought to be respected and obeyed by members of the community. GR(G) is a secondary need. It emerges in vP when the following conditions are satisfied.

gr1 $\Sigma_{P \in T}\ rosa(vP,P,t) > 20*|T|$, where T is the set of these members P of the community G for whom vP has model M(P) and |T| denotes the number of elements of set T;

gr2. the result of consistency algorithms applied to NRV (G) is 'NRV(G) does not contradict the norms, rules and behaviours in NRV(vP) and NRV(Ga) for communities Ga to which vP belongs', where NRV(vP) denotes the norms, rules and behaviours of vP;

gr3. vP executed activities $AVvk(Pk1, \ldots, Pknk)$ (k=1, ..., r) together with members Pk1, ..., Pknk of the community G, in time (t1k, t2k) (where $t2k \leq t$), and vP has perceived that AVvk(Pk1, ..., Pknk) altered bef(vP,bki,t1k) by $dy(bki,t2k)$, for i=1, ..., tk, and r=0 or $Zb(G) > 2$ if r>0, where $Zb(G) = 0$ if r=0, and $Zb(G) = \Sigma_{k=1}\ _r \Sigma_{n=1}\ _{tk} sqrt(desm(bki,t2k)*|dy(bki,t2k|)*sign(dy(bki,t2k))$, if r>0

$desm(bkt,\ t2k) = max(des(vP,bki,\ t1k),\ des(vP,bki,t2k))$;

gr4. members Pje (e=1, ... uj) of the community G executed activities AVu(u=1, ..., w), in times (t1u, t2u) (where $t2u \leq t$), and vP has perceived that AVu altered bef(vP,bui,t1u) by dy(bui,t2u), for i=1, ..., nu, and w=0 or $ZPb(G) > 2$ if w>0, where $ZPb(G) = 0$ if w=0, and $ZPb(G) = \Sigma_{n=1\ w}\ \Sigma_{n=nw} sqrt(dem(bui,t2u)*|dy(bui,t2u)|)*sign(dy(bui,t2u))$, if w>0;

gr5 vP perceives—believes—(at time t) that if she/he/it belongs to the community G then vP will be able to execute activities AVh1, ..., AVhm such that AVhi would increase bef(vP,bhie,t) by sdy(bhie,t), for e=1, ..., and m=0 or $Zer(G) > 3$ if m>0, where Zer(G)=0 if m=0, and $Zer(G) = \Sigma_{i=1\ m}\ \Sigma_{e=1}\ sqrt(des(vP,bh1e,t)*sdy(bhie,t))$, if m>0.

GR1. When conditions gr1, ..., gr5 are satisfied and $Zb(G) + ZPb(G) + Zer(G) > 5$ (time t) then $Bd(vP) := Bd(vP) \cup \{GR(G)\}$; $NRV(vP) := NRV(vP) \cup NRV(G)$;

$ogr(G) := min(max(gc1*(Zb(G) + ZPb(G) + Zer(G)),\ 1),\ 16)$; $cgr(G) := -0.6*ogr(G)$;

$bef(vP,GR(G),t) := ogr(G) - 0.1*(ogr(G) - cgr(G))$; $des(vP,\ GR(G),t) := 1$;

where $0.05 \leq gc1 \leq 0.4$ (sugg. gc1=0.1).

GR2. If $GR(G) \in Bd(vP)$, vP executed activity $AVv(P1, \ldots, Pn)$ together with members P1, ..., Pn of the community G, in time (t1, t2), and vP has perceived that AVv(P1, ..., Pn) altered bef(vP,bi,t1) by dy(bi,t2), for i=1, ..., u, then:

$Zub = \Sigma_{i=}sqrt(max(des(vP,bi,t1),\ des(vP,bi,t2))*|dy(bi,t2)|)*sign(dy(b1,t2))$;

$ogr(G) := min(ogr(G) + gc2*Zub,\ 28)$; $cgr(G) := max(cgr(G) - 0.6*gc2*Zub,\ -25)$;

$bef(vP,GR(G),t2) := min(max(bef(vP,GR(G),t2) + gb1*Zub,\ cgr(G)),\ ogr(G))$;

$des(vP,GR(G),t2) := max(min(des(vP,GR(G),t2) - 1.7*gb1*Zub,\ 2*(ogr(G) - cgr(G)),\ 0.5)$;

where $0.03 \leq gc2 \leq 0.4$, $0.03 \leq gb1 \leq 0.8$ (sugg.gc2=0.1, gb1=0.25).

GR3. Time dependent alteration of bef(vP,GR(G),t). Every 30 days execute following operations, with priority 3:

$ogr(G) := max(ogr(G) - gro*1n(1.1 + ogr(G)),\ 0.5)$; $cgr(G) := min(cgr(G) + gro*1n(1.1 + |cgr(G|),\ 0)$;

if $bef(vP,GR(G),t) \geq 0$ then $bef(vP,GR(G),t) := max(bef(vP,GR(G),t) -$ $grz*1nn(1.1+bef(vP,GR(G),t)$ $-egr(G))$, 0) else $bef(vP,GR(G),t):=\min(\max(bef(vP,GR(G),t), cgr(G)), ogr(G))$;

$des(vP,GR(G),t)=\min(des(vP,GR(G),t)+grd*1n(20+des(vP,GR(G),t)), 1.8*(ogr(G)-cgr(G))$;

where $0.002 \leq gro \leq 0.2$, $0.002 \leq grz \leq 0.2$, $0.002 \leq grd \leq 0.2$ (sugg.gro=0.027, grz=0.03, grd=0.031)

Rules GR1, GR2, GR4, GR5 have priority 2. bef(vP,GR(G),t) decreases when vP is in situation Sg1 and Sg2:

Sg1: The result of perceiving and cognition algorithms of vP (at time t) is: if I executed activity AVw together with members of the community G then bef(vP,bwi,t) would alter by day(bwi), for i=1, ... ,u>0, so that:

$Zua(t)=\Sigma_{t=1,w} sqrt(des(vP,bwi,t)*|\text{day}(bwi,t|)*\text{sign}(day(bwi))>2$.

Sg2: Because members of the community G cannot execute or do not want to execute activity AVw together with vP (e g vP is separated from the community G), vP executes activity AVr (instead AVw), in time (t,t1), which alters bef(vP,bwi,t) by dy(bwi,t1), for i=1, ... u, so that:

$dZug(t1)=Zua(t)-\Sigma_{t=1} sqrt(\max(des(vP,bwi,t), des(vP,bwi,t1))*|dy(bwi,t1|)*\text{sign}(dy(bwi,t1)))>2$.

GR4. When vP is in situation Sg1 and Sg2 then:

$ogr(G):=\min(ogr(G)+gr1*dZug(t1), 26)$; $cgr(G).=\max(cgr(G)-0.7*gr1*dZug(t1), -25)$;

$bef(vP,GR(G),t1).=\max(bef(vP,GR(G),t1)-2.5*gr1*dZug(t1), cgr(G))$;

$des(vP,GR(G),t1):=\min(des(vP,GR(G),t)+4.5*gr1*dZug(t1), 1.8*(ogr(G)-cgr(G))$;

where $0.03 \leq gr1 \leq 0.4$ (sugg. gr1=0.1).

GR5. When members of community G executed activity AVgv, in time (t, t1), and vP has perceived that AVgv hanged bef(vP,bgi,t) by dy(bgi), for i=1, ... ,u, so that $Zug(t1)=\Sigma_{n=1,w} sqrt(\max(des(vP,bgi, t), des(vP,bgi, t1))*|dy(bgi|)*\text{sign}(dy(bgi))<-2$ then:

$ogr(G):=\max(ogr(G)+gr3*Zug(t1), 0.5)$; $cgr(G):=\min(cgr(G)-0.7*gr3*Zug(t1), 0)$;

$bef(vP,GR(G),t1).=\min(\max(bef(vP,GR(G),t1)+3*gr3*Zug(t), cgr(G)), ogr(G))$;

$des(vP,GR(G),t1).=\max(des(vP,GR(G),t1)+gr3*Zug(t1), 0)$;

where $0.03 \leq gr3 \leq 0.4$ (sugg. gr3=0.1).

bef(vP,MA,t); MA—to have power over people and animals. Let OP and OPj (j=1,2, ... ) denote an artificial creature (e g vP), a virtual organization or institution, virtual human or animal, virtual group of people, virtual deity Human has an innate need for power over people and animals. We assume,

- $-28 \leq cma(OP) \leq bef(OP,MA,t) \leq oma(OP) \leq 30$ and bef(OP,MA,ts)=0.4*oma(OP) is the initial value, where oma(OP)>0, oma(OP) and cma(OP) are determined individually for each OP. Below, instead of cma(OP) and oma(OP), we write cma and oma.
- bef(vP,MA,t) and des(vP,MA,t) change in following cases.

m1. vP ordered OP to execute or to stop activity AVop, or vP executed activity AVv to cause OP to execute or to stop activity AVop (OP stops activity AVop if OP breaks off this activity or OP will not do this activity in future);

m2. vP has made OP harm and OP has to bear it (vP harms OP when vP decreases bef(OP,b,.), for some needs b∈Bd (OP));

m3 vP gets more power or vP loses power;

m4. time dependent decrease of desire for power.

In order to formulate situations m1, m2, m3 more precisely, we introduce new stimulus pattern and situations Sub, Sun, SVub, SVun which describe the power relations between vP and OP. The new stimulus pattern has the form:

$((Nba, Nb), eru(OP,b)=x; \text{where } C)$ where $-50 \leq x \leq 50$ and C denotes a condition. If condition C holds and this pattern is applied then bef(OP,b,t), des(OP,b,t), epr(OP,eru, ... ) and enr(OP,eru, ... ) are determined as follows (4.3) if $x \geq 0$ then begin $Zu.=gd*x*1n(1+0.1*(og(b)-bef(OP,b,t)))$; $bef(OP,b,t).=\min(bef(OP,b,t)+Zu, og(b))$;

$des(OP,b,t).=\max(des(OP,b,t)-1.7*Zu, 1)$ end else been $Zu.=gd*x*1n(1+0.1*(bef(OP,b,t)-cg(b)))$; $bef(OP,b,t).=\max(bef(OP,b,t)+Zu, cg(b))$;

$des(OP,b,t)=\min(des(OP,b,t)-1.7*Zu, 2*(og(b)-cg(b)))$ end;

where $cg(b) \leq bef(OP,b,t) \leq og(b)$, $0.6 \leq gd \leq 1.2$ (sugg. gd=0.9).

$epr(OP,eru,b,a,t):=(Nba/Nb)*des(OP,b,t)*dzu*23$, if $x \geq 0$;

$enr(OP,eru,b,a,t):=(Nba/Nb)*des(OP,b,t)*dab*23$, if $x \leq 0$;

where dzu=bef(OP,b,t)-bfb, dab=bfb-befOP,b,t,), bfb is the value of bef(OP,b,t) before execution of operation (4.3) and bef(OP,b,t) is the value after execution of operation (4.3).

Sub: Mub(vP,OP,Npa,Np;(Ber;Cu); dpm(vP); nRM(OP)) where: Npa≤Np, Npa and Np are natural numbers, Ber—(the scope of power of vP over OP) is a set of orders which vP may give OP, Cu—conditions for execution of orders from Ber, dpm(vP)—some patterns of the form '(Nma, Nm), eru(vP,MA)=x; where C', where x≥0, nRM(OP)—a set of negative stimulus patterns of the form '(Nobia, Nobi), fsn(OP,bi)=. ... ; where CAi', where fsn denotes enb, unb, enbu, unbu, vpb, eru The meaning: When vP gives an order belonging to Ber to OP and conditions in Cu hold then OP will execute this order with probability Npa/Np. If OP does not execute this order (although conditions in Cu hold) then OP will be punished (with probability Nobia/Nobi) by negative stimulus according to appropriate pattern ' ... fsn(OP,bi)=.' in nRM(OP). When vP achieves situation Sub then bef(vP,MA,.) increases according to appropriate pattern in dpm(vP).

Sun: Mun(vP, OP, (Berop;Ct); dnm(vP); Nua,Nu, nRM(vP)), where. Berop—(the scope of power of OP over vP) a set of orders which OP may give to vP, Cu—conditions for execution of orders in Berop, rosa(vP,Anu,t)<0 for Anu in Berop, dnm(vP)—some patterns of the form '(Nma, Nm), eru(vP,MA)=y; where C', where 0≥y, nRM(vP)—a set of negative stimulus patterns of the form '(Nobia, Nob1), fsn(vPbi)= ... ; where CAi'. The meaning. When vP has received order Anu∈Berop from OP and conditions in Cu hold then vP must execute the order Anu. If vP does not execute order Anu (although conditions in Cu hold) then vP will be punished (with probability Nua/Nu) by negative stimulus according to appropriate pattern '... fsni(vP,bi)= ...' in nRM(vP).

SVub: MVub(vP, AVv, OP, Nvoa,Nvo; AVop; where Cu). The meaning. When vP has executed activity AVv and conditions in Cu hold then vP expects that OP executes (or stops) activity AVop with probability Nvoa/Nvo.

SVun. MVun(OP, AVo; vP, AVp; where Cu; Nsa,Ns, SAVs), where SAVs denotes a situation or an activity, |rosa(vP, SAVs,t)|>2 and rosa(vP,AVp,t)<−2. When OP executes activity AVo, conditions in Cu hold and vP does not execute (or stop) activity AVp then vP will be (with probability Nva/Ns) in one of the following two situations:

(un1) vP is in situation SAVs (or must execute activity SAVs, respectively), if rosa(vP,SAVs,t)<−2;

(un2) vP does not achieve situation SAVs or vP must leave situation SAVs (or vP cannot execute activity SAVs), if rosa(vP, SAVs, t)>2.

If vP executes activity AVp then vP will be neither in situation (un1) nor in situation (un2).

The following rules (they have priority 2, except MA4) describe more exactly changes of bef(vP,MA,t).

MA1.1. When (i) vP is in situation Sub, (ii) vP has given order An1∈Ber to OP (time t), where conditions in Cu hold, (iii) OP executed the order An1, then.

$Maz1.=gmz1*(d1-Npa/Np)*1n(1.1+0.2*(oma-bef(vP,MA,t)))*sqrt(1+eres(vP,An1,t));$ $bef(vP,MA,t).=min(bef(vP,MA,t)+Maz1, oma); des(vP,MA,t):=max(des(vP,MA,t)-1.2*Maz1, 1);$ where $1 \leq d1 \leq 1.4, 0.005 \leq gmz1 \leq 0.3$ (sugg.: $d1=1.2, gmz1=0.08$) and $eres(vP,An1,t)=rosa(vP,An1,t)$ if $rosa(vP,An1,t)>0$ (and is defined), otherwise $eres(vP,An1,t)=0$.

MA1.1.1 If conditions (i) and (ii) in MA1.1 hold and OP refused to execute order An1 then.

$Mab1.=gma1*(a1+Npa/Np)*1n(1.1+0.2*(bef(vP,MA,t)-cma))*sqrt(1+eres(vP,An1,t));$ $bef(vP,MA,t).=max(bef(vP,MA,t)-Mab1, cma); des(vP,MA,t):=min(des(vP,MA,t)+1.8*Mab1, 1);$ where $0 \leq a1 \leq 0.4, 0.008 \leq gma1 \leq 0.5$ (sugg. a1=0.05, gma1=0.12).

MA1.2. When (i) vP is in Situation Sun, (ii) vP has received order Anu∈Berop from OP, where conditions in Cu hold, (iii) vP has executed order Anu (time t), then:

$M12.=gm12*(d1-Nua/Nu)*1n(1+0.2*(bef(vP,MA,t)-cma))*sqrt(1+|rosa(vP,Anu,t)|);$ $bef(vP,MA,t).=max(bef(vP,MA,t)-M12, cma); des(vP,MA,t):=min(des(vP,MA,t)+1.6*M12, 2*(oma-cma)));$ where $0.005 \leq gm12 \leq 0.4$ (sugg.: gm12=0.08) and d1 is given in MA1.1

MA1.2.1 When conditions (i) and (ii) in MA1.2 hold, vP has refused to execute the order Anu and vP has not been punished by negative stimuli given in nRM(vP,Anu), then $Ma3:=gm11*(a1+Nua/Nu)*1n(1.1+0.2*(oma-bef(vP,MA,t)))*sqrt(1+|rosa(vP,nRM(vP,Anu),t)|);$ $bef(vP,MA,t):=min(bef(vP,MA,t)+Ma3, oma); des(vP,MA,t).=max(des(vP,MA,t)-1.3*Ma3, 1);$ where $0.006 \leq gm11 \leq 0.6$ (sugg gm11=0.09), a1 is given in MA1.1.1 and nRM(vP,Anu) are the patterns in nRM(vP) which are applied when vP refuses to execute the order Anu.

MA1.2.2 When conditions (i) and (ii) in MA1.2 hold, vP has refused to execute the order Anu and vP has been punished by negative stimuli according to patterns in nRM (vP,Anu), then:

$M22=gm2*(d1-Nua/Nu)*1n(1.1+0.2*(bef(vP,MA,t)-cma))*sqrt(1+|rosa(vP,nRM(vP,Anu),t)|);$ $bef(vP,MA,t):=max(bef(vP,MA,t)-M22, cma); des(vP,MA,t)=min(des(vP,MA,t)+2*M22, 2*(oma-cma)));$ where $0.008 \leq gm2 \leq 0.7$ (sugg. gm2=0.165) and d1 is given in MA1.1.

MA1.3. When (i) vP is in situation SVub, (ii) vP has executed activity AVv with respect to OP, where conditions in Cu hold, (iii) OP executed (or stopped execution of) activity AVop (time t) as vP has wished, then.

$Maz2.=gmz2*(d1-Nvoa/Nvo)*1n(1.1+0.2*(oma-bef(vP,MA,t)))*sqrt(1+eres(vP,AVop,t));$ $bef(vP,MA,t).=min(bef(vP,MA,t)+Maz2, oma); des(vP,MA,t):=max(des(vP,MA,t)-1.2*Maz2, 1);$ where $0.006 \leq gmz2 \leq 0.6$ (sugg. gmz2=0.09) and d1, eres are given in MA1.1.

MA1.3.1. When conditions (i) and (ii) in MA1.3 hold and OP refused to execute (or to stop) activity AVop (time t) then:

$Mab2=gma2*(a1+Nvoa/Nvo)*1n(1.1+0.2*(bef(vP,MA,t)-cma))*sqrt(1+eres(vP,AVop,t));$ $bef(vP,MA,t):=max(bef(vP,MA,t)-Mab2, cma); des(vP,MA,t):=min(des(vP,MA,t)+1.8*Mab2, 2*(oma-cma));$ where $0.006 \leq gma2 \leq 0.6$ (sugg. gmz2=0.13) and a1 is given in MA1.1.1.

MA1.4. When (i) vP is in situation SVun, (ii) OP has executed activity AVo with respect to vP, where conditions in Cu hold, (iii) vP has executed (or stopped the execution of) activity AVp (time t) as OP wished, then:

$Mav1.=gmv*(d1-Nsa/Ns)*1n(1.1+0.2*(bef(vP,MA,t)-cma))*sqrt(1+|rosa(vP,AVp,t)|);$ $bef(vP,MA,t):=max(bef(vP,MA,t)-Mav1, cma); des(vP,MA,t):=min(des(vP,MA,t)+1.7*Mav1, 2*(oma-cma));$ where $0.006 \leq gmv \leq 0.6$ (sugg. gmv=0.09) and d1 is given in MA1.1.

MA1.4.1. When conditions (i) and (ii) in MA1.4 hold, vP has not executed (does not stop execution of) activity AVp and neither (un1) nor (un2) (in SVun) has taken place (Zeitp t), then:

$Mavz:=gmov1*(a1+Nsa/Ns)*1n(1.1+0.2*(oma-bef(vP,MA,t)))*sqrt(1+|rosa(vP,AVp,t)|);$ $bef(vP,MA,t).=min(bef(vP,MA,t)+Mavz, oma); des(vP,MA,t):=max(des(vP,MA,t)-1.3*Mavz, 1);$ where $0.006 \leq gmov1 \leq 0.6$ (sugg gmov1=0.07) and a1 is given in MA1.1.1.

MA1.4.2. When conditions (i) and (ii) in MA1.4 hold, vP has not executed (does not stop execution of) activity AVp and either (un1) or (un2) has taken place (Zeitp t), then:

$Mav2.=gmv2*(d1-Nsa/Ns)*1n(1.1+0.2*(bef(vP,MA,t)-cma))*sqrt(1+|rosa(vP,SAVs,t)|);$ $bef(vP,MA,t):=max(bef(vP,MA,t)-Mav2, cma); des(vP,MA,t):=min(des(vP,MA,t)+1.8*Mav2, 2*(oma-cma));$ where $0.007 \leq gmv2 \leq 0.7$ (sugg. gmv2=0.17) and d1 is given in MA1.1.

MA2.1 When (i) OP has executed activity AVsop (time t) which has harmed (or may harm) vP (rosa(vP,AVsop,t)<−3), (ii) vP perceives that OP has executed activity AVsop in order to harm vP, (iii) vP can/could prevent/diminish the harm of the activity AVsop only in degree $0 \leq pv \leq 1$, then $Mab3 = gm3*(1.1-pv)*1n(1.1+0.2*(bef(vP,MA,t)-cma))*sqrt(1+|rosa(vP,AVsop,t)|);$ $bef(vP,MA,t):=max(bef(vP,MA,t)-Mab3, cma); des(vP,MA,t):=min(des(vP,MA,t)+2*Mab3, 2*(oma-cma));$ where $0.008 \leq gm3 \leq 0.7$ (sugg. gm3=0.17).

MA2.1.1. When conditions (i) and (iii) in MA2.1 hold and, according to vP, OP has not executed activity AVsop in order to harm (has not had the intention to harm) vP then.

$bef(vP,MA,t):=max(bef(vP,MA,t)-0.2*Mab3,cma); des(vP,MA,t):=min(des(vP,MA,t)+0.35*Mab3, 2*(oma-cma))$ where Mab3 is given in MA2.1.

MA2.2. When (i) vP has executed activity AVsv (time t) in order to harm OP (according to vP, rosa(OP,AVsv,t)<0), (ii) OP can/could prevent/diminish the harm of the activity AVsv only in degree $0 \leq ps \leq 1$, then.

$Maz3 := gmz3*(0.9-ps)*1n(1.1+0.2*(oma-bef(vP,MA,t)))*sqrt(4+|wpros(OP,AVsv,t)|);$ $bef(vP,MA,t):=max(min(bef(vP,MA,t)+Maz3, oma), cma); des(vP,MA,t):=max(des(vP,MA,t)-1.4*Maz3, 1);$ where $0.008 \leq gmz3 \leq 0.6$ (sugg gmz3=0.12) and vP perceives value rosa(OP,AVsv,t) as wpros(OP,AVsv,t).

MA3.1 When vP has achieved new situation Sub (time 1) then determine bef(vP,MA,t) and des(vP,MA,t) by the valid pattern '(Nma, Nm), eru(vP,MA)=x; ... ' in dpm(vP). After this pattern has been applied (s. (4.3)), replace this pattern, in dpm(vP), by '((10,10), eru(vP,MA)=−x; where vP leaves Sub)'.

MA3.1.1 When vP leaves situation Sub (ceases to be in situation Sub, time t) and in dpm(vP) is pattern '((10,10), eru(vP,MA)=x1; where vP leaves Sub)' (x1<0) then decrease bef(vP,MA,t) and increase des(vP,MA,t) by the pattern 'eru(vP,MA)=x1' as given in (4.3) (where b=MA).

MA3.2. When vP has got in situation Sun (time t) then determine bef(vP,MA,t) and des(vP,MA,t) by the valid pattern '(Nma, Nm), eru(vP,MA)=y; ... ' in dnm(vP). After this pattern has been applied (s. (4.3)), replace this pattern (in dnm(vP)) by '((10,10), eru(vP,MA)=−y; where vP leaves Sun)'.

MA3.2.1. When vP leaves situation Sun (time t) and pattern '((10,10), eru(vP,MA)=y1; where vP leaves Sun)' (y1>0) is in dnm(vP) then increase bef(vP,MA,t) and decrease des(vP,MA,t) by the pattern 'eru(vP,MA)=y1' as given in (4.3) (where b=MA).

MA3.3 When vP has achieved situation SVub (time t) then:

$Maz5 := gmz2*(a1+Nvoa/Nvo)*1n(1.1+0.2*(oma-bef(vP,MA,t)))*sqrt(1+eres(vP,AVop,t));$ $bef(vP,MA,t):=min(bef(vP,MA,t)+1.4*Maz5, oma); des(vP,MA,t):=max(des(vP,MA,t)-1.5*Maz5, 1);$ where gmz2 and eres (here and in MA3 3 1) have the same meaning as in MA1.3.

MA3.3.1. When vP leaves SVub (time t) then:

$Maz6 := gmz2*(a1+Nvoa/Nvo)*1n(1.1+0.2*(bef(vP,MA,t)-cma))*sqrt(1+eres(vP,AVop,t));$ $bef(vP,MA,t):=max(bef(vP,MA,t)-1.4*Maz6, cma); des(vP,MA,t):=min(des(vP,MA,t)+1.5*Maz6, 2*(oma-cma))$ MA3.4 When vP has got in situation SVun (time t) then.

$Mav3 := gmv*(a1+Nsa/Ns)*1n(1.1+0.2*(bef(vP,MA,t)-cma))*sqrt(1+|rosa(vP,AVp,t)|);$ $bef(vP,MA,t):=max(bef(vP,MA,t)-1.4*Mav3, cma); des(vP,MA,t):=min(des(vP,MA,t)+1.6*Mav3,2*(oma-cma)),$ where, here and in MA3.4.1, gmv is given in MA1.4.

MA3.4.1 When vP leaves situation SVun (time t) then $Mav4 := gmv*(a1+Nsa/Ns)*1n(1.1+0.2*(oma-bef(vP,MA,t)))*sqrt(1+|rosa(vP,AVp,t)|);$ $bef(vP,MA,t):=min(bef(vP,MA,t)+1.4*Mav4, oma); des(vP,MA,t)=max(des(vP,MA,t)-1.5*Mav4, 1).$ MA4. Time dependent alteration—every d hours execute (with priority 3) the following operations:

$bef(vP,MA,t):=min(bef(vP,MA,t)+gmt*1n(1.1+0.05*(1-bef(vP,MA,t)), 0), if bef(vP,MA,t)<0;$ $des(vP,MA,t):=max(des(vP,MA,t)-gmt1*1n(1.1+0.2*des(vP,MA,t)), 1);$ where gmt and gmt1 depend on vP, $0.004 \leq gmt \leq 0.2$, $0.005 \leq gmt1 < 0.2$ (e g gmt=0.014, gmt1=0.02, d=3).

bef(vP,LI,t); LI—need for liking and love. It is a collective notion. LI consists of needs LI(vP,OSA)—liking and love of vP to OSA—where OSA denotes an object, a situation or an activity. LI(vP,OSA) is close connected with the expectation of vP that OSA increases bef(vP,b,t) or prevents the decrease of bef(vP,b,t), for some needs b.

EXAMPLES:

LI(Fr,Ma)—the love of woman Fr to man Ma. Fr expects that Ma increases bef(Fr, bi,t) for $b1 \in \{SE, AN, GR, ...\}$. Fr expects also that Ma does not execute activity which decreases bef(Fr,b1,t), if Fr does not accept this decrease. LI(K1,E1)—the love of child Ki to parents E1. Ki expects that: (i) the parents E1 increase bef(Ki,bk,t) and prevent an essential decrease of these values, for $bk \in \{NU, SN, GR, AN, LE, ...\}$, (ii) zulteb(E1,Ki,t) is great and abhas(E1,Ki,t)<1 (the meaning of these functions is given in Sect. 2). LI(E1, Ki)—the love of parents E1 to child Ki. Ki increases bef(E1,bf,t), for bf in $\{NA, GR, MA, AN, ...\}$ E1 expect that zulieb(Ki,E1,t) is great and abhas(Ki,E1,t)<1.

Below, instead of LI(vP,OSA), o1(vP,OSA), c1(vP,OSA), we write in short LI(OSA), o1(OSA), c1(OSA). It holds $-30 \leq c1(OSA) \leq bef(vP,LI(OSA),t) \leq o1(vP,OSA) \leq 30$.

In standard situations, bef(vP,LI(OSA),t), o1(OSA), ... are determined as follows (except LI1.3, with priority 2):

LI1.1. When (i) vP perceives (time t) that OSA has increased bef(vP,b,t−tb) by dy(b)>1 or has prevented the decrease of bef(vP,b,t−tb) by dy(b), in time (t−tb,t), (ii) if OSA is an object then vP thinks 'OSA has not been obliged to increase bef(vP,b,t−tb) (to prevent the decrease of bef(vP, b,t−tb) respectively)', (iii) des(vP,b,t−tb)>3, (iv) bef(vP,LI (OSA),t) and LI(OSA) are not defined, (v) zulteb(vP,OSA, t)>2.5*abhas(vP,OSA,t), abhas(vP,OSA,t)<10, nros(vP, OSA,t)<100 and pros(vP,OSA,t)>2.5*nros(vP,OSA,t), then.

$Bd(vP):=Bd(vP) \cup \{LI(OSA)\}; bef(vP,LI(OSA),t)=0.2*sqrt(des(vP,b, t-tb)*dy(b));$ $des(vP,LI(OSA),t):=1; o1(OSA):=bef(vP,LI(OSA),t)+1; c1(OSA):=-0.6*o1(OSA).$ LI1.2. When conditions (i), (ii) and (v) in LI1.1 hold, LI(OSA) is defined and des(vP,b,t−tb)*dy(b)>1 then:

if $-8 \leq o1(OSA) \leq 20$ then $po1.=o1(OSA)+8$ else if $o1(OSA) \geq 20$ then $po1=28$ else $po1=0$;

$Loz.=g1o*ln(31-o1(OSA))*sqrt(des(vP,b,t-tb)*dy(b)*sqrt(po1))$;

$o1(OSA):=min(o1(OSA)+Loz, 30); c1(OSA):=max(c1(OSA)-0.6*Loz, -30)$;

$Lbz.=g1b*ln(1.1+0.2*(o1(OSA))-bef(vP,LI(OSA),t)))*.sqrt(des(vP,b,t-tb)*dy(b)*sqrt(po1))$;

$bef(vP,LI(OSA),t):=min(bef(vP,LI(OSA),t)+Lbz, o1(OSA))$;

$des(vP,LI(OSA),t).=max(des(vP,LI(OSA),t)-1.6*Lbz, 0.6)$;

where $0.001 \leq g1o \leq 0.2$, $0.01 \leq g1b \leq 0.5$ (sugg.g1o=0.008, g1b=0.1).

LI1.3. Every n days execute (with priority 3) the following operations (LI(OSA) is defined).

$Lor:=g1r*sqrt(o1(OSA)-c1(OSA))$;

if $o1(OSA)>0$ then $o1(OSA):=max(o1(OSA)-Lor, 0); c1(OSA).=min(c1(OSA)+0.2*Lor, o1(OSA) -1, 0)$, $bef(vP,LI(OSA),t).=max(min(bef(vP,LI(OSA),t), o1(OSA)), c1(OSA))$;

$des(vP,LI(OSA),t):=max(des(vP,LI(OSA),t)-g1zr*sqrt(o1(OSA)+des(vP,b,t)), 0.6)$;

where $0.0001 \leq g1r \leq 0.4$, $0.0001 \leq g1zr \leq 0.7$, $5 \leq n \leq 60$ (sugg.: g1r=0.02, g1zr=0.026, n=30).

Let vPa be a human or artificial creature different from vP.

LI2.1. When bef(vP,LI(vPa),t) is defined and vP has perceived that vPa has refused to increase bef(vP,b,t) or to prevent the decrease of bef(vP,b,t) by more than 1, although vPa could do it, then:

$Loa:=gloa*ln(1+o1(vPa)-c1(vPa))*sqrt(des(vP,b,t))$;

if $-8 \leq o1(vPa)$ then $o1(vPa)=max(o1(vPa)-Loa, -8)$;

if $-7 \leq o1(vPa)$ $c1(vPa)<-8$ then $c1(vPa):=min(c1(vPa)+0.4*Loa, -8)$ else if $c1(vPa)>o1(vPa)-1$ then $c1(vPa)=o1(vPa)-1$;

$La1:=g1s*ln(1.1+0.2*(bef(vP,LI(vPa),t)-c1(vPa)))*des(vP,b,t)$;

if $-8<o1(vPa)$ then $bef(vP,LI(vPa),t).=max(bef(vP,LI(vPa),t)-La1, c1(vPa))$ else $bef(vP,LI(vPa),t)=max(min(bef(vP,LI(vPa),t), o1(vPa)), c1(vPa))$;

$des(vP,LI(vPa),t):=max(des(vP,LI(vPa),t)-0.8*La1, 0.6)$;

where $0.005 \leq gloa \leq 0.3$, $0.005 \leq gls \leq 0.3$ (sugg. gloa=0.06, gls=0.05).

LI2.2. When (i) bef(vP,LI(vPa),t) is defined, (ii) vPa increased (before time ti) bef(vP,b,t1−tb) by dy1(b,t1)>1 or prevented the decrease of bef(vP,b,t1−tb) by dy1(b,t1), in time (t1−tb, t2), (iii) at time t>t2, vP has perceived that vPa is not and will not be able to execute activities which would increase bef(vP,b,t) or prevent the decrease of bef(vP,b,t), then.

$po1$=as in LI1.2; $Loa1=glo2*ln(1+o1(vPa)-c1(vPa))*sqrt(des(vP,b,t)*dy1(b,t1)*sqrt(po1))$;

if $1 \leq o1(vPa)$ then $o1(vPa):=max(o1(vPa)-Loa1, 1); e1(vPa):=min(c1(vPa)+0.5*Loa1, o1(vPa)-1, 0)$ end;

$Lz2=g12*ln(1.1+0.2*(bef(vP,LI(vPa),t)-c1(vPa)))*sqrt(des(vP,b,t)*dy1(b,t1)*sqrt(po1))$;

$bef(vP,LI(vPa),t):=max(bef(vP,LI(vPa),t)-Lz2, c1(vPa)); des(vP,LI(vPa),t):=max(des(vP,LI(vPa),t)-1.3*Lz2, 0.6)$ where $0.0002 \leq glo2 \leq 0.02$, $0.005-g12 \leq 0.2$ (sugg. glo2=0.007, g12=0.06).

LI2.3 Let vP1 be different from vPa. When (i) bef(vP,Ll(vPa), t) is defined, (ii) vP perceived (in time (t1,t2)) that vPa could increase bef(vP,b,t) only by maximum dym(b)≧0 or could prevent the decrease of bef(vP,b,t) only by maximum dym(b), where t1<t<t2, (iii) vP has perceived, in time (t2,t2+tb), that vP1 has increased hef(vP,b,t2) by dy(b,t2)>dym(b) or has prevented by dy(b,t2)>dym(b) the decrease of bef (vP,b,t2), then.

$po1$=as in LI1.2; $Loa2:=glo3*ln(1+o1(vPa)-c1(vPa))*sqrt(des(vP,b,t2)*(dy(b,t2)-dym(b))*sqrt(po1))$;

if $1 \leq o1(vPa)$ then begin $o1(vPa).=max(o1(vPa)-Loa2, 1); c1(vPa)=min(c1(vPa)+0.5*Loa2, o1(vPa)-1, 0)$ end;

$bef(vP,LI(vPa), t2+tb).=max(min(bef(vP,LI(vPa), t2+tb), o1(vPa)), c1(vPa))$;

$Lz3.=g13 *ln(1.1+0.2*des(vP,LI(vPa),t2+tb))*sqrt(des(vP,b,t2)*(dy(b,t2)-dym(b))*sqrt(po1))$;

$des(vP,LI(vPa),t2+tb):=max(des(vP,LI(vPa), t2+tb)-Lz3, 0.6)$;

where $0.0004 \leq glo3 \leq 0.03$, $0.005 \leq g13 \leq 0.2$ (sugg:glo3=0.006, g13=0.05)

L13.1. When vP has perceived that vPa intentional decreased or began to decrease bef(vP,b,t−tb) by dy(b)>0.3, or intentional prevented or began to prevent the increase of bef(vP,b,t−tb) by dy(b,t), in time (t−tb,t) (bef(vP,LI(vPa),t) is defined), then $Lo1.=glo4*ln(1+o1(vPa)-c1(vPa))*sqrt(des(vP,b,t)*dy(b))$;

if $o1(vPa)>-15$ then $o1(vPa):=max(o1(vPa)-Lo1, -15); c1(vPa).=min(c1(vPa), o1(vPa)-1)$;

$La2=gls2*ln(1.1+0.2*(bef(vP,LI(vPa),t)-c1(vPa)))*sqrt(des(vP,b,t)*dy(b))$;

$bef(vP,LI(vPa),t).=max(bef(vP,LI(vPa),t)-La2, c1(vPa)); des(vP,LI(vPa),t).=max(des(vP,LI(vPa),t)-2*La2, 0.6)$;

where $0.005 \leq glo4 \leq 0.2$, $0.05 \leq gls2 \leq 0.8$ (sugg. glo4=0.06, gls2=0.3).

L13.2 When vP has perceived that vPa decreased or began to decrease bef(vP,b,t−tb) by dy(b)>0.5 not intentional, or prevented or began to prevent the increase of bef(vP,b,t−tb) by dy(b,t) not intentional, in time (t−tb,t) (bef(vP,LI(vPa),t) is defined), then:

if $o1(vPa)>-1$ then $o1(vPa).=max(o1(vPa)-0.2*Lo1, -1); c1(vPa).=min(c1(vPa), o1(vPa) -2, 0)$, $bef(vP,LI(vPa),t).=max(bef(vP,LI(vPa),t)-0.2*La2, c1(vPa))$;

$des(vP,LI(vPa),t):=max(des(vP,LI(vPa),t)-0.4*La2, 0.6)$;

where Lo1 and La2 are defined in L13 1

LI4.1. bef(vP,LI(OSA),t) is defined. When (i) vP has perceived (time t) that OSA cannot increase bef(vP,b,t) by dy(b)≧0 or prevent the decrease of bef(vP,b,t) by dy(b), in time (t,t2), although OSA did it before time t−dt (dt>0), (ii) vP has perceived (time t) that OSA1 (different from OSA) increases bef(vP,b,t) only by dy1 (b,t)<dy(b) or prevents the decrease of bef(vP,b,t) only by dy(b,t)<dy(b) (if such OSA I does not exist then dyl(bt)=0), then $Ls2=gls3*ln(1.1+0.2*(bef(vP,LI(OSA),t)-c1(OSA)))*sqrt(des(vP,b,t)*(dy(b)-dy1(b,t))*sqrt(po1))$;

$bef(vP,LI(OSA),t):=\max(bef(vP,LI(OSA),t)-Ls2, c1(OSA));$ $des(vP,LI(OSA),t):=\min(des(vP,LI(OSA),t)+1.4*Ls2, 2*(o1(OSA)-c1(OSA)));$ where po1=as in LI1.2, $0.002 \leq gls3 \leq 0.2$ (sugg. gls3=0.04).

LI4.2. When conditions (i) and (ii) in LI4.1 hold and vP has perceived (time t3>t2) that OSA again increases bef(vP, b,t3) by dy3(b,t3)>dy1(b,t) or prevents the decrease of bef(vP,b,t) by dy3(b,t3), then:

$Lz3:=g14*1n(1.1+0.2*(o1(OSA)-bef(vP,LI(OSA),t3)))*sqrt(des(vP,b,t3)*(dy3(b,t3)-dy1(b,t))*sqrt(po1));$ $bef(vP,LI(OSA),t3):=\min(bef(vP,LI(OSA),t3)+Lz3, o1(OSA));$ $des(vP,LI(OSA),t3).=\max(des(vP,LI(OSA),t3)-1.2*Lz3, 1),$ where po1=as in LI1.2, $0.002 \leq g14 \leq 0.2$ (sugg g14=0.04).

LI5.1. bef(vP,LI(vPa),t) is defined. When (i) vP expects (in time (t1,t)) that vPa executes activity which will express the intensity of liking and love of vPa towards vP, zulieb (vPa, vP,t), as value greater than $ez1(t) \geq 0$, (ii) vP has perceived (time t) that vPa has executed activity ALe which has expressed value $zuliew(vPa,vP,t) \geq ez1(t)$ (zuliew(vPa, vP,t) is the intensity zulieb(vPa,vP,t) as vP it perceives), then:

$dze1:=1+zuliew(vPa,vP,t)-ez1(t); Lak1:=gla1*1n(31-o1(vPa))*sqrt(des(vP,LI(vPa),t)*dze1*sqrt(po1));$ $o1(vPa).=\min(o1(vPa)+Lak1, 30); c1(vPa).=\max(c1(vPa)-0.4*Lak1, -30);$ $Lab1=gla2*1n(1.1+0.2*(o1(vPa)-bef(vP,LI(vPa),t)))*sqrt(des(vP,LI(vPa),t)*dze1*sqrt(po1));$ $bef(vP,L(vPa),t)=\min(bef(vP,LI(vPa),t)+Lab1, o1(vPa));$ $des(vP,LI(vPa),t).=\max(des(vP,LI(vPa),t)-1.8*Lab1, 0.6);$ where po1=as in LI1.2, $0.0002 \leq gla1 \leq 0.05$, $0.002 \leq gla2 \leq 0.2$ (sugg. gla1=0.005, gla2=0.055).

LI5.2. When condition (i) in LI5.1 holds and vP has perceived that vPa has executed activity ALs which has expressed intensity zuliew(vPa,vP,t)<ez1(t) or vPa has not done such activity (then zuliew(vPa,vP,t)=0) then:

$dald=des(vP,LI(vPa),t)*(ez1(t)-zuliew(vPa,vP,t)); Las:=glas*1n(1+o1(vPa)-c1(vPa))*sqrt(dald);$ if $o1(vPa)>2$ then $o1(vPa):=\max(o1(vPa)-Las, 2); c1(vPa).=\min(c1(vPa)+0.2*Las, o1(vPa)-1, 0);$ $Las1=glas1*1n(1.1+0.2*(bef(vP,LI(vPa),t)-c1(vPa)))*sqrt(dald);$ $bef(vP,LI(vPa),t):=\max(bef(vP,LI(vPa),t)-Las1, c1(vPa));$ $des(vP,LI(vPa),t).=\max(des(vP,LI(vPa),t)-1.2*Las1, 0.6));$ where $0.0001 \leq glas \leq 0.05$, $0.002 \leq glas1 \leq 0.3$ (sugg. glas=0.006, glas1=0.056).

LI5.3 When vP has perceived (time t) that vPa has executed activity Abn which has expressed the intensity of dislike and hate of vPa towards vP, abhas(vPa,vP,t), as the value abhaw(vPa,vP,t)>1 (according to vP abhaw(vPa,vP,t) equals abhas(vPa,vP,t)), then:

$Lak2:=gla3*1n(1+o1(vPa)-c1(vPa))*sqrt(abhaw(vPa,vP,t)*des(vP,LI(vPa),t));$ if $o1(vPa)>-5$ then $o1(vPa):=\max(o1(vPa)-Lak2, -5); c1(vPa)=\min(c1(vPa)+0.1*Lak2, o1(vPa) -1, 0);$ $Lab2.=gla4*1n(1.1+0.2*(bef(vP,LI(vPa),t)-c1(vPa)))*sqrt(abhaw(vPa,vP,t)*des(vP,LI(vPa),t));$ $bef(vPa,LI(vPa),t).=\max(bef(vP,LI(vPa),t)-Lab2, c1(vPa));$ $des(vP,LI(vPa),t):=\max(des(vP,LI(vPa),t)-1.8*Lab2, 0.6));$ where $0.001 \leq gla3 \leq 0.2$, $0.01 \leq gla4 \leq 0.8$ (sugg. gla3=0.017, gla4=0.15).

LI5.4. bef(vP,LI(vPa),t) is defined. When (i) vP has perceived (time t) that vPa has executed activities which have increased the intensity of liking and love of vPa towards vP1, zulieb(vPa,vP1,t−t1), by dzu1(vP1,t) and therefore the intensity zuhew(vPa,vP,t) has decreased or will decrease (according to vP, ziiew(vPa,vP,t) equals zulheb(vPa,vP,t) ), (ii) vP does not accept, in degree $0 < an1(vPa,vP1) \leq 1$, the activities of vPa which cause the increase of zulieb(vPa, vP1,.), then $Lea.=glea*an1(vPa,vP1)*1n(1.1+0.2*(bef(vP,LI(vPa),t)-c1(vPa)))*sqrt(dzu1(vP1,t)*des(vP,LI(vPa),t)*sqrt(po1));$ $bef(vP,LI(vPa),t).=\max(bef(vP,LI(vPa),t)-Lea, c1(vPa));$ $des(vP,LI(vPa),t):=\min(des(vP,LI(vPa),t)+1.8*Lea, 2*(o1(vPa)-c1(vPa));$ where po1=as in LI1.2, $0.003 \leq glea \leq 0.5$ (sugg. glea=0.05).

bef(vP,AN,t); AN—need for recognition, acknowledgment and self-esteem. AN is always connected with a community G of artificial creatures or people. Instead of inaccurate need AN, we use AN(G)—need for recognition, acknowledgment and self-esteem in community G, where G may be vP. bef(vP,AN(vP),t) and des(vP,AN(vP),t) represent the state of self-esteem of vP. In general, hef(vP,AN(G) t) changes when vP belongs to community G and one of the following situations occur:

an1. Members of community G execute activities which contain stimulus patterns of the form ' . . . fs(vP,AN(G))= . . . ';

an2. vP achieves (or loses) higher rank in community G, i e vP achieves (or leaves, respectively) situation which contain patterns of the form given in (an1);

an3. vP has accomplished (very good, good, . . . ) threshold values, norms or goals of community G, an4. vP has executed activity belonging to NRV(G) (NRV(G) is the set of norms, principles, rules and behaviours of community G) and members of community G have done valuation behaviours concerning this activity of vP.

Also changes of hef(vP,AN(G),t) in cases (an3) and (an4) must be described by stimulus patterns of the form given in (an1), in appropriate situation models and activity schemes.

bef(vP,MB,t); MB—material and financial needs. MB are secondary needs. They realize or support the following primary needs. SN, NU, MA, SE, LE, AN, GR, NE, NA, GE, BZ(Sz). Needs MB are realized by objects which have sale or exchange values. Below, we use the following notations:

z eu Ob-z en of object Oh, where en denotes a measure (e g 1 kg apples, 10 ha forest);

u(z en Ob,t)—money value (price) of z en Ob at time t; thus u(z US$ money, t)=z US$, u(1 piece house H1, t)=the price of house H1 at time t;

u(AVd, vP,t)—price of activity AVd (a service) when this activity is done as vP wishes (at time t).

It holds $-30 \leq cmb \leq bef(vP,MB \ t) \leq omb \leq 30$.

The initial values: omb=5, cmb=−1, bef(vP,MB,ts)=3, des(vP,MBP,ts)=1.

In standard situations, cmb, omb, bef(vP,MB,t) and des (vP,MB,t) are determined (with priority 2) as follows:

MB1.1. When (i) vP has perceived (time t) that eu Ob will increase bef(vP,be,t) by dy(be)>0.3 or prevent the decrease of bef(vP,be,t) by dy(be), in time (t,t1), where des(vP,be,t)*dy(be)>1, for e=1, . . . , n, when vP uses z eu Ob (by activities which vP may execute), (ii) u(z en Ob,t) is defined, (iii) vP has got z eu Ob (time t), then $M1.=sqrt(des(vP,b1,t)*dy(b1)+ \ldots +des$
$(vP,bn,t)*dy(bn)); \; omb.=min(omb+gm1*1n(31-omb)*M1, omb+1, 30);$ $Mb1.=gmb*1n(1.1+0.2*(omb-bef(vP,MB,t)))*M1;$ $bef(vP,MB,t):=min(bef(vP,MB,t)+Mb1, omb); \; des(vP,MB,t).= max(des(vP,MB,t)-1.5*Mb1, 1);$ where $0.0002 \leq gm1 \leq 0.07$, $0.01 \leq gmb \leq 0.5$ (sugg. gm1=0.009, gmb=0.17).

MB1.2 When conditions (i) and (ii) in MB1.1 hold and vP has perceived (time t) that vP can use only z1 EUR<$\mu$(z eu Ob,t)*0.95 for buying z eu Ob, then.

$M2:=sqrt(des(vP,b1,t)*dy(b1)++des(vP,bn,t)*dy(bn))*(1-0.9*(z1 \; EUR/\mu(z \; eu \; Ob,t)));$ $cmb:=max(cmb-gm2*1n(31+cmb)*M2, cmb-0.7, -30);$ $Mb2:=gmb2*1n(1.1+0.2*(bef(vP,MB,t)-cmb))*M2;$ $bef(vP,MB,t):=max(bef(vP,MB,t)-Mb2,cmb); \; des(vP,MB,t).=min(des(vP,MB,t)+1.8*Mb2, 2*(omb-cmb));$ where $0.0002 \leq gm2 \leq 0.04$, $0.02 \leq gmb2 \leq 0.5$ (sugg. gm2=0.006, gmb2=0.13).

Conditions in MB1.1 (and MB1.2) describe a situation, Sm11 (Sm12, respectively). Operations in MB1.1 (MB1.2, respectively) are executed only then (one time) when vP reaches situation Sm11 (Sm12, respectively).

MB2.1. When (i) vP has separated from object z eu Ob (time t−dt) and cannot get new object z eu Ob, (ii) u(z eu Ob,t) is defined, (iii) vP perceives (time t) that the separation from z eu Ob has decreased or will decrease bef(vP,be,t−d) by ds(be)>0.3, or has prevented or will prevent the increase of bef(vP,be,t) by ds(be), where des(vP,be,t)*ds(be)>1, for e=1, . . . ,n, then:

$M21=sqrt(des(vP,b1,t)*ds(b1)+ \ldots +des(vP,bn,t)*ds(bn));$ $cmb=max(cmb-gm21*1n(31+cmb)*M21, cmb-0.7, -30);$ $Mb3=gmb3*1n(1.1+0.2*(bef(vP,MB,t)-cmb))*M21;$ $bef(vP,MB,t):=max(bef(vP,MB,t)-Mb3, cmb);$ $des(vP,MB,t)=min(des(vP,MB,t)+1.8*Mb3, 2*(omb-cmb));$ where $0.0002 \leq gm21 \leq 0.04$, $0.02 \leq gmb3 \leq 0.5$ (sugg. gm21=0.006, gmb3=0.13).

MB2.2. When (i) vP has separated from object z eu Ob (time t1−dt) and vP perceives (in time (t1−dt,t1−0.3*dt)) that this separation (i e not using z eu Ob) has decreased or will decrease bef(vP,be, t1−dt) by ds(be)>0.3, or has prevented or will prevent the increase of bef(vP,be,1−dt) by ds(be), for e=1 . . . ,u, where des(vP,be,t1−0.3*dt)* ds(be)>1, (ii) vP has got object zl eul Obi (time t, t1≤t≤t1+2*dt) that has increased bef(vP,ble,t) by dy(ble)>0.3 or has prevented the unwished decrease of bef(vP,ble,t) by dy(ble), for e=1, . . . ,n, where des(vP,ble,t)*dy(ble)>1, (iii),u(z eu Ob,t1−dt) and u(zl eul Obl,t) are defined, (iv) $M21=sqrt(des(vP,b1,t1-0.3*dt)*ds(b1)+ \ldots +des(vP,bu,t1-0.3*dt)*ds(bu))$ and $M22=sqrt(des(vP,b11,t)*dy(b11)+ \ldots +des(vP,bln,t)*dy(bln))$, then:

(v) if M21<M22 then:

$omb:=min(omb+gm1*1n(31-omb)*(M22-M21), omb+1, 30);$ $Mb2:=gmb1*1n(1.1+0.2*(omb-bef(vP,MB,t)))*(M22-M21);$ $bef(vP,MB,t):=min(bef(vP,MB,t)+Mb22, omb); \; des(vP,MB,t)=max(des(vP,MB,t)-1.5*Mb22, 1);$ where gm1 and gmb1 are given in MB1.1;

(vi) if M21>M22 then:

$cmb:=max(cmb-gm21*1n(31+cmb)*(M21-M22), cmb-0.7, -30);$ $Mb23=gmb3*1n(1.1+0.2*(bef(vP,MB,t)-cmb))*(M21-M22);$ $bef(vP,MB,t).=max(bef(vP,MB,t)-Mb23, cmb); \; des(vP,MB,t):=min(des(vP,MB,t)+1.8*Mb23, 2*(omb-cmb));$ where gm21 and gmb3 are given in MB21.

MB3.1. When (i) vP perceives (time t) that execution of activity AVd (a service), so as vP wishes, would increase bef(vP,be,t) by dy(be)>0.3 or would prevent unwished decrease of bef(vP,be,t) by dy(be), in time (t,t1), where $des(vp,be,t)*dy(be)>1$, for e=1, . . . ,n, (ii) $\mu$(AVd,vP,t) is defined, (iii) AVd is done as vP wishes, then perform operations given in MB1.1.

MB3.2. When conditions (i) and (ii) in MB3.1 hold and vP perceives (time t) that she/he/it has only z1 EUR<0.95*$\mu$(AVd,vP,t) for the wished service AVd, and therefore the service AVd is not done to vP, then (similarly as in MB1.2):

$M2:=sqrt(des(vP,b1,t)*dy(b1)+ \ldots +des(vP,bn,t)*dy(bn))*(1-0.9*(z1 \; EUR/\mu(AVd,vP,t)));$ $cmb:=max(cmb-gm2*1n(31+cmb)*M2, cmbp-0.7, -30);$ $Mb2:=gmb2*1n(1.1+0.2*(bef(vP,MB,t)-cmb))*M2;$ $bef(vP,MB,t):=max(bef(vP,MB,t)-Mb2, cmb); \; des(vP,MB,t):=min(des(vP,MB,t)+1.8*Mb2, 2*(omb-cmb));$ where gm2 and gmb2 are given in MB 1.2.

bef(vP,NA,t); NA—have children. It holds:

$cn \leq des(vP,NA,t) \leq on, 0.1 \leq on \leq 30.$

Initial values: cn:=−0.7* on; bef(vP,NA,ts):=on−0.05*(on−cn); des(vP,NA,ts).=1.4*(on−bef(vP,NA,ts)).

A new born virtual child, having virtual parents vPm and vPf, may from the beginning be grow up. It may gain knowledge and activity models from the parents vPm and vPf create (generate) a child when they perform creation behaviour KZV The result of this behaviour is a new virtual creature vPk who has a match of object, situation and activity models and cognition algorithms of vPm and vPf. The parents, however, are authorized to modify object, situation and activity models and cognition algorithms of vPk. vPm and vPf may do activity KZV only if $1 \leq on, bef(vPx,NA,t) \leq on -1, 3.5 \leq des(vPx,NA,t)$, for x='m', 'f'.

NA1. Every 30 days, if des(vP,b,t)<17, for b∈Bd(vP) and b≠NA, are executed following operations:

$bef(vP,NA,t):=max(bef(vP,NA,t)-0.5, on); \; des(vP,NA,t)=min(des(vP,NA,t)+1, 2*(on-cn)).$ NA2. If des(vP,b,t)>20 for a need b≠NA and t1≤t≤t2, where t2=t1+15 days, then:

$bef(vP,NA,t2):=\min(bef(vP,NA,t2)+0.25, on); des(vP,NA,t2):=\max(des(vP,NA,t2)-0.5, 0.5).$ NA3. When vP has performed creation behaviour KZV and gets child vPk (time t) then:

$o1(vPk):=25; c1(vPk):=-15; bef(vP,LI(vPk),t):=o1(vPk)-2; des(vP, LI(vPk),t):=3; on=on-1; cn.=cn+0.5;$ $bef(vP,NA,t).=on; des(vP,NA,t):=0.5; abhas(vP,vPk,t).=0; zulieb(vP, vPk,t).=500; Fmk:=Fmk\cup\{vPk\};$ where Fmk denotes the (community) family of vPk.

bef(vP,BZ(SMsz),t); BZ(SMsz)—achieve goal situation (of vP) SMsz, where vP has the model SMsz. BZ(SMsz) is a secondary need vP has decided (time t1), by her/his/its cognition algorithms (e g motivation and control procedures), that situation SMvz is her/his/its goal which vP will to achieve until time t2. Let pz(I) be the probability of achieving goal situation SMsz, as vP estimates at time t. pz(t) expresses the hope of vP (at time t) of achieving the goal SMsz. SMvz is added to list LZS of goal situations as follows (s. Schurmann [AS1] (2000), Sect. 3.2):

(4.4) (SMsz, pz(t), t1, t2; dsE1, . . . , dsEu; AV1, . . . , AVw; . . . )

where dsEt denotes a new stimulus pattern of the goal SMsz (added to the list in time (t1,t)) and AVe (e≦w) are activities by which vP planes to achieve the goal SMsz. dsEi has one of the two forms ('dser'; ((Na,N), fs(vP,b)=). . . )–vP expects (with probability Na/N) that, (immediately) after vP achieves the goal SMsz, bef(vP,b,.) and des(vP,b,.) will change according to the patternfv(vP,b)= . . . (in most cases,fs is here a pattern that increases bef(vP,b,.));

('dsne'; ((Na,N), fs(vP,b)=). . . )–vP expects (with probability Na/N) that, when vP does not achieve goal situation SMsz, bef(vP,b,.) and des(vP,b,.) will change according to the pattern fs(vP,b)= . . . (in most cases, fs is here a pattern that decreases bef(vP,b,.))

Let:

Bp=|{ . . . fsp(vP,b)=) is in SMsz or ('dser'; ( . . . fsp(vP,b)= . . . )) is attached=to situation SMsz, in the list LZS}, wherefsp is name of a positive stimulus pattern (epb, epbu, upb, upbu, vtzb, eru if eru(vP,b)=x and x>0), Bn={b|( . . . fsn(P,b)=) is in SMfsz or ('dser'; ( . . . fsn(vP,b)= . . . )) is attached to SMsz in the list LZS}, where fsn is name of a negative stimulus pattern (enb, enbu, unb, unbu, vpb, eru if eru(vP,b)=y and y<0), Dp={b|('dsne'; ( . . . fvp(vP,b)= . . . )) is attached to SMsz in LZS}, Dn={b|('dsne'; ( . . . fsn(vP,b)= . . . )) is attached to SMsz in LZS}

The intensity of stimulus of goal situation SMvz (at time t), if vP) would achieve goal situation SMsz, equals:

$rzse(vP,SMsz,t)=\Sigma_{b\in Bp}\ epr(vP,fsp,b,a,t)-\Sigma_{b\in Bn}\ enr(vP,fsn,b,a,t)$ (the meaning of epr and enr is given in Sect. 2).

The intensity of stimulus of goal situation SMsz (at time t), if vP would not achieve goal situation SMsz, equals:

$rzsn(vP,SMsz,t)=\Sigma_{b\in Dp}\ epr(vP,fsp,b,a,t)-\Sigma_{b\in Dn}\ enr(vPf,sn,b,a,t)$ Below, instead of SMsz, we write in short Sz. It holds $cz(Sz) \leq bef(vP,BZ(Sz),t) \leq oz(Sz).$ bef(vP,BZ(Sz),t) and des(vP,BZ(Sz),t) are determined by the following rules (with priority 2)

BZ1. When cognition algorithms of vP have decided/concluded that Sz is goal situation (time t, Sz is added to the list LZS) then $Bd(vP)=Bd(vP)\cup\{BZ(Sz)\}; oz(Sz).=\min(gzo*sqrt(rzse(vP,Sz, t)*pz(t)), 18); cz(Sz)=-0.7*oz(Sz);$ $bef(vP,BZ(Sz),t)=oz(Sz)-0.9*(oz(Sz)-cz(Sz)); des(vP,BZ(Sz),t):= 1.6*(oz(Sz)-cz(Sz));$ where pz(t) has the same meaning as in the list LZS and $0.04 \leq gzo \leq 0.9$ (sugg. gzo=0.38).

BZ2.1 When vP has achieved intermediate goal zSz of the goal Sz (time t) and vP thinks that the probability pz(t) of achieving the goal Sz has changed by dpz(t)=pz(t)–pz(ta) (where pz(ta) is the probability attached to Sz in the list LZS) then.

i. if dpz(t)≧0 then:

$efr.=sqrt(dpz(t)*rzse(vP,Sz,t)); oz(Sz):=\min(oz(Sz)+gzo1*efr, 30); cz(Sz)=\max(cz(Sz)-0.6*gzo1*efr, -28);$ $oz1=oz(Sz)-0.2*(oz(Sz)-cz(Sz)); Lz1=gz1*efr*1n(1.1+0.2*(oz1-bef(vP,BZ(Sz),t)));$ $bef(vP,BZ(Sz),t):=\min(bef(vP,BZ(Sz),t)+Lz1, oz1);$ $des(vP,BZ(Sz),t).=\max(des(vP,BZ(Sz),t)-1.2*Lz1, 0.3*(oz(Sz)-cz(Sz));$ ii. if dpz(t)<0 then:

$efr.=sqrt(-dpz(t)*rzse(vP,Sz,t)); oz(Sz):=\max(oz(Sz)-gzo1*efr, cz(Sz)+1);$ $cz(Sz):=\min(cz(Sz)+0.5*gzo1*efr, oz(Sz)-1);$ $Lz1.=gz1*efr*1n(1.1+0.2*(bef(vP,BZ(Sz),t)-cz(Sz))); bef(vP,BZ(Sz), t):=\max(bef(vP,BZ(Sz),t)-Lz1, cz(Sz));$ $des(vP,BZ(Sz),t):=\min(des(vP,BZ(Sz),t)+1.3*Lz1, 1.8*(oz(Sz)-cz(Sz));$ where $0.001 \leq gzo1 \leq 0.4$, $0.02 \leq gz1 \leq 0.8$ (sugg. gzo1=0.03, gz1:=0.18).

BZ2.2. When vP has achieved goal situation Sz (time t) then (delete Sz in the list LZS):

$Bd(vP).=Bd(vP)-\{BZ(Sz)\}; bef(vP,BZ(Sz),t):=oz(Sz); des(vP,BZ(Sz), t)=0.$

BZ2.3. When (i) vP executes activities in order to achieve goal Sz, in time (t–xt, t), (ii) in this time vP has perceived an obstacle which prevents, in degree 0<gv≦1, the achieving of the goal Sz (if gv=1 then, according to vP, he/she/it cannot achieve Sz), then $efr=sqrt(gv*pz(t-xt)*rzse(vP,Sz,t)); Lz2.=gz2*efr; oz(Sz):=\max-(oz(Sz)-gzo2*efr, cz(Sz)+1);$ $cz(Sz):=\min(cz(Sz)+0.4*gzo2*efr, oz(Sz)-1); bef(vP,BZ(Sz),t):= \max(bef(vP,BZ(Sz),t)-Lz2, cz(Sz));$ $des(vP,BZ(Sz),t):=\min(des(vP,BZ(Sz),t)+1.2*Lz2, 1.8*(oz(Sz)-cz(Sz));$ where $0.05 \leq gzo2 \leq 0.7$, $0.1 \leq gz2 \leq 2$ (sugg. gzo2=0.13, gz2=0.28).

BZ2.4. When (i) vP believed (at time t–xt) that she/he/it would achieve goal Sz, with probability pz(t–xt), (ii) vP has perceived, in time (t–xt,t), that vP does not or cannot achieve the goal Sz, then.

$efr1:-sqrt(pz(t-xt))*(sqrt(rzse(vP,Sz,t))-sign(rzsn(vP,Sz, t))*sqrt(|rzsn(vP,Sz,t)|);$ $oz(Sz)\mathrel{.}=\max(oz(Sz)-gzo3*efr1,\ cz(Sz)+1);\ cz(Sz):=\min(cz(Sz)+0.3*gzo3*efr1,\ oz(Sz)-1);\ Lz3:=gz3*efr1;$ $bef(vP,BZ(Sz),t):=\max(bef(vP,BZ(Sz),t)-Lz3,\ cz(Sz));$ $des(vP,BZ(Sz),t)\mathrel{.}=\min(des(vP,BZ(Sz),t)+Lz3,\ 1.8*(oz(Sz)-cz(Sz));$ where $0.04 \leq gzo3 \leq 0.7$, $0.5 \leq gz3 \leq 4$ (sugg. gzo3=0.14, gz3=0.5).

Afterwards, if $oz(Sz-cz(Sz))>1$, $bef(vP,BZ(Sz),.)$ and des $(vP,BZ(Sz),.)$ change every n days as follows:

$Loz\mathrel{.}=gzr*sqrt(oz(Sz)-cz(Sz));\ oz(Sz):=oz(Sz)-Loz;\ cz(Sz):=\min(cz(Sz)+0.4*Loz,\ oz(Sz)-0.6);$ $bef(vP,BZ(Sz),t):=\max(\min(bef(vP,BZ(Sz),t),\ oz(Sz),\ cz(Sz));\ des(vP,BZ(Sz),t)\mathrel{.}=\max(des(vP,BZ(Sz),t)-3.8*Loz,\ 1)$ where $0.001 \leq gzr \leq 0.4$, $1 \leq n \leq 60$ (sugg. gzr=0.07, n=10)
bef(vP,BH(OK),t), BH(OK)—help object OK if it needs help, where OK denotes an artificial creature, a living object or a group of artificial creatures or living objects. It holds $-18 \leq mch(vP)-ch(OK) \leq bef(vP,BH(OK),t) \leq oh(OK) \leq moh(vP) \leq 25.$ Below, instead of mch(vP) and moh(vP), we write in short mch und moh. If moh-mh$\leq$2 then vP has not the need BH. Let. mch$\leq$0, moh>2;

$zulb(vP,OK,t)=zulieb(vP,OK,t)$ if $zulieb(vP,OK,t)$ is defined, $zulb(vP,OK,t)=0$ otherwise;

$abh(vP,OK,t)=abhas(vP,OK,t)$ if $abhas(vP,OK,t)$ is defined, $ahh(vP,OK,t)=0$ otherwise;

zfw(OK,b,t)=the value zful(OK,b,t) as vP perceives it, e g vP believes that zfw (H,SN,t)=-20 although person H perceives that $zful$(H,SN,t)=1 (the meanings of zulieb, abhas and zful are given in Sect 2);
dsw(OK,b,t)=the value des(OK,b,t) as vP perceives it;

$WA=\{b|dsw(OK,b,t)>0.33*\max(dsw(OK,b1,t),\ \text{for}\ b1\in Bd(OK))\};$ $WP=\{b|des(vP,b,t)>0.33*\max(des(vP,b1,t),\ \text{for}\ b1\in Bd(vP))\},$ $unku(vP,t)=\Sigma_{b\in WP}\ zful(vP,b,t);\ ukw(OK,b,t)=\Sigma_{b\in WA}\ zfw(OK,b,t);$ $shu(OK,t)=(sc1(vP)+sqrt(abh(vP,OK,t))/(sqrt(z1b(vP,OK,t)+5),$ if OK is not child of vP=-20, if OK is child of vP, where $5 \leq sc1(vP) \leq 800$ (sugg $sc1(vP)$=90);

$unfs(vP,OK,t)=unku(vP,t)-ukw(OK,t)-shu(OK,t)$ (if $unfs(vP,OK,t)<0$ then vP has not the need to help OK);

$z1h(vP,OK,t)=zu1b(vP,OK,t)-sc2(vP)*abh(vP,OK,t)+1$, where $0.2 \leq sc2(vP) \leq 2$ (if $z1h(vP,OK,t)<0$ then vP has not the need to help OK).

BH1. When (i) unfs(vP,OK,t)>0^z1h(vP,OK,t)>0^ ukw (OK,t)<0, (ii) vP perceives/believes (time t) that OK cannot do any activity which would increase ukw(OK,t), then.
iii. if bef(vP,BH(OK),t) is not defined:

$Bd(vP)\mathrel{.}=Bd(vP)\cup\{BH(OK)\};\ d4=0.2;$ $oh(OK)=\min(gho*sqrt(unfs(vP,OK,t)*z1h(vP,OK,t)),\ 0.8*moh);\ ch(OK)\mathrel{.}=\max(0.6*mch,\ -0.5*oh(OK));$ $bef(vP,BH(OK),t):=oh(OK)-0.6*(oh(OK)-ch(OK));\ des(vP,BH(OK),t)=oh(OK)-ch(OK));$ where $0.004 \leq gho \leq 0.4$ (sugg. gho=0.08);
iv. if bef(vP,BH(OK),t) is defined.
$Lho\mathrel{.}=gho1*sqrt(unfs(vP,OK,t)*z1h(vP,OK,t));\ ch(OK):=\max(ch(OK)-Lho,\ ch(OK)-d4*(ch(OK)-mch));$ $Lh1\mathrel{.}=gh1*1n(1.1+0.2*(bef(vP,BH(OK),t)-ch(OK)))*sqrt(unfs(vP,OK,t)*z1h(vP,OK,t));$ $bef(vP,BH(OK),t)\mathrel{.}=\max(bef(vP,BH(OK),t)-Lh1,ch(OK));$ $des(vP,BH(OK),t)\mathrel{.}=\min(des(vP,BH(OK),t)+2.3*Lh1,\ 2*(oh(OK)-ch(OK));$ where $0.0005 \leq gho1 \leq 0.1$, $0.005 \leq gh1 \leq 0.2$ (sugg. gho1=0.01, gh1=0.04).

BH2.1 When (i) bef(vP,BH(OK),t-xt) is defined, (ii) unfs(vP,OK,t-xt)>0^z1h(vP,OK,t-xt)>0 ^ukw(OK,t-xt)<0,
(iii) vP perceived/believed (time t-xt) that OK could not do any activity in order to increase ukw(OK, t-xt), (iv) vP has executed activities which have increased ukw(OK,t-xt) by dzw, in time (t-xt,t), then:

$Lho1:=gho2*sqrt((1+d4*(moh-oh(OK)))*z1h(vP,OK,t-xt))*dzw/unfs(vP,OK,t-xt);$ $oh(OK)\mathrel{.}=\min(oh(OK)+Lho1,\ oh(OK)+d4*(moh-oh(OK)));$ $bef(vP,BH(OK),t):=\min(bef(vP,BH(OK),t)+gh2*sqrt((oh(OK)-bef(vP,BH(OK),t))*z1h(vP,OK,t-xt))*dzw/unfs(vP,OK,t-xt),\ oh(OK));$ $des(vP,BH(OK),t)=\max(des(vP,BH(OK),t)*ghs*(1-dzw/unfs(vP,OK,t-xt)),0.3);$ where $0.005 \leq gho2 \leq 0.9$, $0.02 \leq gh2 \leq 0.9$, $0.02 \leq ghs \leq 1.2$ (sugg gho2=0.1, gh2=0.3, ghs=0.25).

BH2.2. When (i) conditions (i), (ii) and (iii) in BH2 1held, (ii) vP did not execute activity to increase ukw(OK,t-xt),
(iii) vP perceives (time t) that other vPa did activities which have increased ukw(OK,t-xt) by dzw, then.

$bef(vP,BH(OK),t):=\min(bef(vP,BH(OK),t)+0.4*gh2*sqrt((oh(OK)-bef(vP,BH(OK),t)))*z1h(vP,OK,t-xt))*\ dzw/unfs(vP,OK,t-xt),\ oh(OK));$ $des(vP,BH(OK),t)\mathrel{.}=\max(0.5*(oh(OK)-bef(vP,BH(OK),t)),0.3).$ BH2.3. When (i) conditions (i), (ii), (iii) and (iv) in BH2.1 held, (ii) at time t+zt, vP perceives that the value ukw(OK, t-xt) was false and that the real value of ukw(OK,t-xt) was equal to rukw(OK,t-xt) and rukw(OK,t-xt) ukw(OK,t-xt) >2, then:

$rkw\mathrel{.}=sqrt(rukw(OK,t-xt)-ukw(OK,t-xt));\ shu(OK)=shu(OK)+5+rkw;\ och:=oh(OK)-ch(OK);$ $Lho2=gho3*1n(1+0.1*och)*rkw;\ oh(OK)\mathrel{.}=\max(oh(OK)-Lho2,\ oh(OK)-0.35*och);$ $ch(OK)=\min(ch(OK)+0.7*Lho2,\ ch(OK)+0.25*och);$ $bef(v,BH(OK),t+zt):=\max(\min(bef(vP,BH(OK),t+zt),\ oh(OK)),\ ch(OK));\ des(vP,BH(OK),t)\mathrel{.}=0.3;$ where $0.01 \leq gho3 \leq 1$ (sugg. gho3=0.3).

BH3. When (i) vP executed in the past (time (t1-xt,t1)) activities in order to increase ukw(OK,t1-xt) (bef(vP,BH (OK), t1) was determined), (ii) now (time t), OK has executed activities which have caused harm to vP (i.e. decreased bef(vP,b,t-at) or prevented the increase of bef(vP, b,t-at), for some needs b), then:

$d4:=d4*0.85;\ shu(OK)\mathrel{.}=shu(OK)+30;\ och:=oh(OK)-ch(OK);$ $oh(OK):=oh(OK)-0.45*och;\ ch(OK)=ch(OK)+0.35*och;$ $bef(vP,BH(OK),t):=\max(\min(bef(vP,BH(OK),t),\ oh(OK)),\ ch(OK));\ des(vP,BH(OK),t)\mathrel{.}=0.$ References

[AS1] Schurmann A. Darstellung von Emotionen in Elektronischen Geräten; international patent application submitted to Deutsches Patent- und Markenamt (German Patent and Trade Mark Office) in Munchen, international application No. PCT/DE00/03210; international filing date Sep. 14, 2000; English translation ("Representation of Emotions in Electronic Devices") is submitted to the U K Patent Office, Application No. GB 0204181.2.

[AS2] Schurmann A.: An Idea how to Define Semantics for a Simple Natural Language; (48 pages), 1999, the paper may be send by the author.

[AS3] Schurmann A.: A Simple Thinking Artificial Servant; (48 pages), 1998; the paper may be send by the author.

[AS4] Schurmann A. Cooperation in a Motivated, Behaviour Based Multi-Agent System; (16 pages), 1998; the paper may be send by the author.

What is claimed is:

1. A method for calculating intensities of satisfactions and desires, or tensions of needs, of a virtual creature such as motivated agent system, virtual human in entertainment software or in Internet, denoted by vP, where this system and method can be embodied/implemented in said creature vP, comprising:

determining intensities of satisfaction and desire of said vP with respect to the needs for attention and identification, determining intensities of satisfaction and desire of said vP with respect to curiosity and the need for knowledge, determining intensities of satisfaction and desire of said vP with respect to the need for belonging to a community, determining intensities of satisfaction and desire of said vP with respect to the need for power over people and animals, determining intensities of satisfaction and desire of said vP with respect to the need for liking and love, determining intensities of satisfaction and desire of said vP with respect to material and financial needs, determining intensities of satisfaction and desire of said vP with respect to the need to achieve goal situation, determining intensities of satisfaction and desire of said vP with respect to the need to have children, determining intensities of satisfaction and desire of said vP with respect to the need to help a living object and calculating intensities of satisfactions and desires of said vP by stimulus patterns connected with perceived objects, situations and activities.

2. A method according to claim 1, wherein determining intensities of satisfaction and desire of the virtual creature vP of with respect to the needs for attention and identification comprising:

a) function values bef(vP,AU,t) and des(vP,AU,t) representing the current intensities of satisfaction and desire, respectively, of said virtual creature vP (at present time t) with regard to its ground attention (denoted by AU);

software procedure which determines said intensities of satisfaction bef(vP,AU,t) and desire des(vP,AU,t) of said creature vP with regard to said ground attention AU, every given period of time (e.g. every 2 min), when vP is active, wherein said procedure use the last value of said satisfaction bef(vP,AU,t) and the current intensity of desire for relaxation of said vP;

b) function values bef(vP,AUw(OS),t) and des(vP,AUw (OS),t) representing the current intensities of satisfaction and desire, respectively, of said virtual creature vP (at present time t) with regard to the need for attention and identification with respect to an object or a situation, denoted by OS, (this need is denoted by AUw(OS));

software procedures which determine said intensities of satisfaction bef(vP,AUw(OS),t) and desire des(vP,AUw (OS),t) of said vP with respect to said need for attention and identification AUw(OS), when said vP is identifying said object or situation OS, wherein said procedures use said current values of satisfaction bef(vP,AU,t) and desire des(vP,AU,t) and current intensities of positive stimulus and negative stimulus of said object or situation OS, where said vP has an object or situation model of said OS and said intensities of positive and negative stimuli are calculated by stimulus patterns connected with said model of OS;

c) function values bef(vP,AUa(AV),t) and des(vP,AUa (AV),t) representing the current intensities of satisfaction and desire, respectively, of said virtual creature vP (at Present time t) with regard to the need for attention and identification with respect to an activity, denoted by AV, (this need is denoted by AUa(AV)); and software procedures which determine said intensities of satisfaction bef(vP,AUa(AV),t) and desire des(vP,AUa (AV),t) of said vP with respect to said need for attention and identification AUa(AV), when said vP is executing said activity AV, wherein said procedures use said current values of satisfaction bef(vP,AU,t) and desire des(vP,AU,t), and current intensities of positive stimulus and negative stimulus of the current executed (by vP) sub-activity of said activity AV, where vP has a model (or a scheme) of said activity AV and said intensities of positive and negative stimuli are calculated by stimulus patterns connected with said model of activity AV.

3. A method according to claim 1, wherein determining intensities of satisfaction and desire of the virtual creature vP of with regard to curiosity and the need for knowledge comprising:

a) function values bef(vP,NEw(OS),t) and des(vP,NEw (Os),t) representing the current intensities of satisfaction and desire, respectively, of said virtual creature vP (at present time t) with regard to curiosity and the need for knowledge with respect to an object or a situation, denoted by OS, (this need is denoted by NEw(OS)), where said satisfaction value bef(vP,NEw(OS),t) is greater than or equal to a changing limit value, denoted by cnw(OS), and less than or equal to a changing limit value, denoted by onw(OS);

software procedures which determine said intensities of satisfaction bef(vP,NEw(OS),t) and desire des(vP,NEw (OS),t) of said creature vP with regard to said curiosity and the need for knowledge NEw(OS), when said vP perceives said object or situation OS, wherein said procedures use the last and the current said limit values cnw(OS) and onw(OS), and the last values of said satisfaction bef(vP,NEw(OS),t) and desire des(vP,NEw (OS),t);

b) function values bef(vP,NEk(OSM),t) and des(vP,NEk (OSM),t) representing the current intensities of satisfaction and desire, respectively, of said virtual creature vP (at present time t) with regard to the need for knowledge of an object or situation model, denoted by OSM, (this need is denoted by NEk(OSM)), where said satisfaction value bef(vP,NEk(OSM),t) is greater than or equal to a changing limit value, denoted by cnk (OSM), and less than or equal to a changing limit value, denoted by onk(OSM);

software procedures which determine said intensities of satisfaction bef(vP,NEk(OSM),t) and desire des(vP,NEk(OSM),t) of said creature vP with regard to said need NEk(OSM) for knowledge of said object or situation model OSM, when vP has applied its own cognition algorithm to said model OSM, wherein said procedures use the last and the current said limit values cnk(OSM) and onk(OSM), and the last values of said satisfaction bef(vP,NEk(OSM),t) and desire des(vP,NEk(OSM),t);

c) function values bef(vP,NEz(SM),t) and des(vP,NEz(SM),t) representing the current intensities of satisfaction and desire, respectively, of said creature vP (at present time t) with regard to the need "how can a goal situation, denoted by SM, be achieved" (this need is denoted by NEz(SM)), where said satisfaction value bef(vP,NEz(SM),t) is greater than or equal to a changing limit value, denoted by cnz(SM), and less than or equal to a changing limit value, denoted by onz(SM); and software procedures which determine said intensities of satisfaction bef(vP,NEz(SM),t) and desire des(vP,NEz(SM),t) of said vP with regard to said need NEz(SM) "how can goal situation SM be achieved", when vP builds a new activity model (or scheme) such that its execution should lead to said situation SM, wherein said procedures use the last and the current said limit values cnz(SM) and onz(SM), and the last values of said satisfaction bef(vP,NEz(SM),t) and desire des(vP,NEz(SM),t).

4. A method according to claim 1, wherein determining intensities of satisfaction and desire of the virtual creature vP of with regard to the need for belonging to a community comprising:

function values bef(vP,GR(G),t) and des(vP,GR(G),t) representing the current intensities of satisfaction and desire, respectively, of said virtual creature vP (at present time t) with regard to the need for belonging to a community, denoted by G, (this need is denoted by GR(G)), where said satisfaction value bef(vP,GR(G),t) is greater than or equal to a changing limit value, denoted by cgr(G), and less than or equal to a changing limit value, denoted by ogr(G), and software procedures which determine said intensities of satisfaction bef(vP,GR(G),t) and desire des(vP,GR(G),t) of said creature vP with regard to said need GR(G) for belonging to community G, when said vP executes or cannot execute an activity (denoted by AVv) with members of said community G, or members of said community G execute an activity (denoted by AVgr), such that said activity AVv or AVgr, respectively, changes some intensities of satisfactions of vP, denoted by bef(vP,b,t), by some values dy(b), for some needs b of vP, wherein said procedures use the last and the current said limit values cgr(G) and ogr(G), and the last said values of satisfaction bef(vP,GR(G),t) and desire des(vP,GR(G),t), and said values dy(b).

5. A method according to claim 1, wherein determining intensities of satisfaction and desire of the virtual creature vP of with regard to the need for power over people and animals comprising:

function values bef(vP,MA,t) and des(vP,MA,t) representing the current intensities of satisfaction and desire, respectively, of said virtual creature vP (at present time t) with regard to the need for power over people and animals (this need is denoted by MA), where said satisfaction value bef(vP,MA,t) is greater than or equal to a changing limit value, denoted by cma, and less than or equal to a changing limit value, denoted by oma, and software procedures which determine said intensities of satisfaction bef(vP,MA,t) and desire des(vP,MA,t) of said creature vP with regard to said need MA for power over people and animals, when vP is in one of the three situations:

(sm1) said vP ordered an artificial creature or a virtual organization (denoted by OP) to execute or to stop an activity (denoted by AVo), or said vP has executed an activity (denoted by AVv) to cause said OP to execute or to stop an activity AVo, (sm2) said vP has made said OP a harm and OP has to bear it, (sm3) said vP gets more power or vP loses power, wherein said procedures use the last and the current said limit values cma and oma, and the last values of said satisfaction bef(vP,MA,t) and desire des(vP,MA,t), and, if vP is in said situation (sm1) or (sm2), intensities of stimuli of said activities AVv and AVo as they are perceived by vP.

6. A method according to claim 1, wherein determining intensities of satisfaction and desire of the virtual creature vP of with regard to the need for liking and love comprising:

function values bef(vP,LI(OSA),t) and des(vP,LI(OSA),t) representing the current intensities of satisfaction and desire, respectively, of said creature vP (at present time t) with regard to the need for liking and love to an object, a situation or an activity (this need is denoted by LI(OSA), where OSA denotes said object, situation or activity), where said satisfaction value bef(vP,LI(OSA),t) is greater than or equal to a changing limit value, denoted by cl(OSA), and less than or equal to a changing limit value, denoted by ol(OSA), and software procedures which determine said intensities of satisfaction bef(vP,LI(OSA),t) and desire des(vP,LI(OSA),t) of said vP with regard to said need LI(OSA) for liking and love to said OSA, when vP is in one of the following situations:

(s1) said OSA has increased (or refuses to increase) some satisfaction values of vP, denoted by bef(vP,b,t), by some values dy(b)>0 or has prevented (or refuses to prevent) a decrease of some satisfaction values of vP, denoted by bef(vP,b,t), by some values dy(b), for some needs b of vP, (s2) said OSA has decreased (or will decrease) some satisfaction values of vP, denoted by bef(vP,b,t), by some values dy(b)>0 or has prevented (or will prevent) an increase of some satisfaction values of vP, denoted by bef(vP,b,t), by some values dy(b), for some needs b of vp, wherein said procedures use the last and the current said limit values cl(OSA) ol(OSA), and the last values of said satisfaction bef(vP,LI(OSA),t) and desire des(vP,LI(OSA),t), and said values dy(b).

7. A method according to claim 1, wherein determining intensities of satisfaction and desire of the virtual creature vP of with regard to material and financial needs (denoted by MB), comprising:

function values bef(vP,MB,t) and des(vP,MB,t) representing the current intensities of satisfaction and desire, respectively, of said virtual creature vP (at present time t) with regard to said material and financial needs MB, and software procedures which determine said intensities of satisfaction bef(vP,MB),t) and desire des(vP,MB,t) of said vP with regard to said material and financial needs MB, when said vP achieves one of the following situations:
- (s1) vP perceives that an object or an activity done to vP would increase some satisfaction values of vP, denoted by bef(vP,b,t), by some values dy(b)>0 or would prevent a decrease of some satisfaction values of vP, denoted by bef(vP,b,t), by some values dy(b), for some needs b of vP, where said object and activity have money values,
- (s2) vP has separated from an object which has money value and perceives that therefore some satisfaction values of vP, denoted by bef(vP,b,t), have decreased (or will decrease) by some values dy(b)>0, for some needs b of vP, wherein said procedures use the last values of said satisfaction bef(vP,MB,t) and desire des(vP,MB,t) and said values dy(b).

8. A method according to claim 1, wherein determining intensities of satisfaction and desire of the virtual creature vP of with regard to the need to have children comprising:

function values bef(vP,NA,t) and des(vP,NA,t) representing the current intensities of satisfaction and desire, respectively, of said creature vP (at present time t) with regard to the need to have children (this need is denoted by NA), where said satisfaction value bef(vP,NA,t) is greater than or equal to a changing limit value, denoted by cn, and less than or equal to a changing limit value, denoted by on, and software procedures which determine said intensities of satisfaction bef(vP,NA,t) and desire des(vP,NA,t) of said vP with regard to said need NA to have children, wherein said procedures use the current said limit values cn and on, and the last values of said satiisfaction bef(vP,NA,t) and desire des(vP,NA,t).

9. A method according to claim 1, wherein determining intensities of satisfaction and desire of the virtual creature vP of with regard to the need to achieve a goal situation of vP comprising:

function values bef(vP,BZ(Sz),t) and des(vP,BZ(Sz),t) representing the current intensities of satisfaction and desire, respectively, of said virtual creature vP (at present time t) with regard to the need to achieve a goal situation of vP (this need is denoted by BZ(Sz), where Sz denotes said goal situation), where said satisfaction value bef(vP,BZ(Sz),t is greater than or equal to a changing limit value, denoted by cz(Sz), and less than or equal to a changing limit value, denoted by oz(Sz), and software procedures which determine said intensities of satisfaction bef(vP,BZ(Sz),t) and desire des(vP,BZ(Sz), t) of said vP with regard to said need BZ(Sz) to achieve said goal situation Sz, when some cognition algorithms of vP have concluded that situation Sz should be a goal and when vP is trying to achieve said situation Sz, wherein said procedures use the last and the current said limit values cz(Sz) and oz(Sz), and the last values of said satisfaction bef(vP,BZ(Sz),t) and desire des(vP, BZ(Sz),t), and the current intensity of stimulus of said goal situation Sz.

10. A method according to claim 1, wherein determining intensities of satisfaction and desire of the virtual creature vP of with regard to the need to help a living object (a real or virtual human, animal or plant) when this living object needs help, comprising:

function values bef(vP,BH(OK),t) and des(vP,BH(OK),t) representing the current intensities of satisfaction and desire, respectively, of said virtual creature vP (at present time t) with regard to said need to help said living object (this need is denoted by BH(OK), where OK denotes said living object), where said satisfaction value bef(vP,BH(OK),t) is greater than or equal to a changing limit value, denoted by ch(OK), and less than or equal to a changing limit value, denoted by oh(OK), and software procedures which determine said intensities of satisfaction bef(vP,BH(OK),t) and desire des(vP,BH(OK),t) of said vP with regard to said need BH(0K) to help said living object OK, wherein said procedures use: (a) the last and the current said limit values ch(OK) and oh(OK), (b) the last values of said satisfaction bef(vP,BH(OK),t) and desire des(vP,BH(OK),t), (c) the current intensity of liking and love of vP to said object OK and the current intensity of dislike and hate of vP to said object OK, (d) and the current intensities of contentment and joy or dissatisfaction, grief and suffering, with respect to needs of vP.

11. A method according to claim 1, wherein calculating intensities of satisfactions and desires of the virtual creature vP of by stimulus patterns comprising:

stimulus patterns with regard to such needs of said creature vP as: be healthy, have no pain, be alive, be in normal environment, the need for visual beauty (let these needs be denoted by bo), where these stimulus patterns are connected with object, situation and activity models of said vP;

function values bef(vP,bo,tp) and des(vP,bo,tp) representing the intensities of satisfactions and desires, respectively, of said creature vP (at time tp, where $t \leq tp \leq t2$ and t is the present time, and $t2-t \leq 1$ month) with regard to said needs bo; and software procedures which calculate said intensities of satisfactions bef(vP,bo,tp) and desires des(vP,bo,tp) of said vP with regard to said time $tp \leq t$ and to each said need bo which occurs in a stimulus pattern of the model (denoted by MOSA) of the object or the situation or the activity which said vP is perceiving (at time t), wherein said procedures calculate said intensities of satisfactions bef(vP,bo,tp) and desires des(vP,bo,tp) by said stimulus patterns (with respect to said needs bo) which are connected with said model MOSA.

* * * * *